(12) United States Patent
LeMeur, Jr. et al.

(10) Patent No.: US 8,424,887 B1
(45) Date of Patent: Apr. 23, 2013

(54) TOP-ACCESSIBLE, HEIGHT-ADJUSTABLE INDUSTRIAL CASTER WHEEL

(75) Inventors: Henri E. LeMeur, Jr., Warren, PA (US); Philip M. Downey, Tidioute, PA (US); Timothy W. Rowles, Youngsville, PA (US)

(73) Assignee: Superior Tire & Rubber Corp., Warren, PA (US)

( * ) Notice: Subject to any disclaimer, the term of this patent is extended or adjusted under 35 U.S.C. 154(b) by 74 days.

(21) Appl. No.: 13/085,535

(22) Filed: Apr. 13, 2011

(51) Int. Cl.
*B60B 33/00* (2006.01)

(52) U.S. Cl.
USPC ............ 280/86.1; 16/18 R; 16/19; 16/45

(58) Field of Classification Search ............ 280/86.1; 16/18 R, 19, 20, 22, 25, 45
See application file for complete search history.

(56) References Cited

U.S. PATENT DOCUMENTS

| | | | | |
|---|---|---|---|---|
| 4,029,311 A * | 6/1977 | Chanslor et al. | | 482/68 |
| 4,722,114 A * | 2/1988 | Neumann | | 16/35 R |
| 6,113,117 A * | 9/2000 | Mimura | | 280/47.11 |
| 7,182,179 B2 * | 2/2007 | Tolfsen | | 188/2 D |
| 7,231,689 B2 * | 6/2007 | Scheiber et al. | | 16/19 |
| 7,353,566 B2 * | 4/2008 | Scheiber et al. | | 16/19 |
| 8,155,918 B2 * | 4/2012 | Reed et al. | | 702/150 |
| 8,251,391 B2 * | 8/2012 | Kohler et al. | | 280/250.1 |
| 8,267,412 B2 * | 9/2012 | Liu | | 280/47.34 |
| 2009/0165207 A1 * | 7/2009 | Reed et al. | | 5/611 |

* cited by examiner

*Primary Examiner* — Toan To
(74) *Attorney, Agent, or Firm* — Roe Global IP Law; Stephen J. Roe

(57) ABSTRACT

A height-adjustable industrial caster wheel includes a mounting plate, a swivel assembly that swivels relative to the mounting plate, and a spring housing that is movable relative to the swivel assembly. The mounting plate or the spring housing is secured to the swivel assembly, such that the relative position of the swivel assembly and either the mounting plate or the spring housing can be controllably altered to change the overall height of the height-adjustable industrial caster wheel. If needed, a locking mechanism can be used to maintain the relative position between the swivel assembly and the mounting plate or the spring housing. The height-adjustable industrial caster wheel can be adjusted by accessing the height-adjustable industrial caster wheel from above, eliminating the need to raise the pallet truck away from the floor to be able to access and adjust the height-adjustable industrial caster wheel.

20 Claims, 11 Drawing Sheets

TOP-ACCESSIBLE, HEIGHT-ADJUSTABLE INDUSTRIAL CASTER WHEEL

BACKGROUND OF THE INVENTION

1. Field of Invention

The invention relates to industrial caster wheels.

2. Description of Related Art

Industrial caster wheels are used, for example, as stabilizer casters on a pallet truck. Typical pallet trucks have a single drive wheel and one industrial caster wheel located at each corner. Usually, each industrial caster wheel has a spring member that absorbs shocks while traveling. The spring member also provides stability as the object to which the height-adjustable industrial caster wheel is attached travels over rough surfaces. U.S. Pat. Nos. 6,425,161 and 7,093,319, each incorporated herein by reference in its entirety, disclose industrial caster wheels having elastomeric spring members.

Pallet trucks are used for a variety of tasks, such as moving pallets between a loading dock and a shipping container or semi trailer or between the loading dock and a storage or redistribution location. When a pallet truck is used to move pallets from the loading dock into the shipping container or semi trailer or from the shipping container or semi trailer onto the loading dock, the operator typically runs the pallet truck at low speeds, due to the limited spaces in the shipping container or semi trailer and/or the loading dock and the typical height offsets between the surface of the loading dock and bottom surface of the shipping container or semi trailer.

The operator's primary concern is to avoid damaging or dislodging any of the goods placed on the pallet as the pallet is being moved. As a result of these considerations, the height-adjustable industrial caster wheels are typically set to provide a relatively soft spring force and to allow the pallet truck to move over uneven surfaces while maintaining the pallet as steady and horizontal as possible.

In contrast, after a given pallet has been moved onto the loading dock, other pallet trucks are used to move the pallet to a storage location, a redistribution location and/or another loading dock. For example, upon receiving a number of pallets from a manufacturer at an inbound loading dock of a warehouse, each containing the same goods, some of those pallets may be immediately transferred to a number of outbound loading docks, with each pallet being moved to a different loading dock for shipping to a different retail store. Other ones of those pallets may be moved to storage shelves, where they will be stored until they are shipped to the various retail stores. In another example, those pallets may be moved to a redistribution location, where the various goods are unloaded from the pallets and either placed into storage or repalletized with other goods from other manufacturers and/or other shipments from the same manufacturer for delivery to a single retail store.

In these cases, the pallet trucks typically move on a smooth, even floor of the warehouse. The operator's primary concern is to move the pallets as rapidly as possible without tipping over or damaging or dislodging any of the goods placed on the pallet. Thus, the operators run the pallet trucks at high speeds along defined paths. These paths unavoidably include turns, sharp corners and/or turning from one path to another. As a result of these considerations, the height-adjustable industrial caster wheels are typically set to provide a relatively stiff spring force and to allow the pallet truck to take high-speed turns over relatively even surfaces while avoiding tipping the pallet truck over and maintaining the pallet as steady and horizontal as possible.

Typically, a warehouse will employ a large number of pallet trucks, some of which will be used to move pallets between the loading docks and shipping containers and/or semi trailers, others of which will be used to move pallets between the loading docks, storage locations and/or redistribution locations, and still others of which are in a repair bay or the like for repairs. Some such repairs include replacing worn drive wheels and/or worn industrial casters.

SUMMARY OF THE INVENTION

In response to a given pallet truck breaking down and needing to be pulled off-line and sent to the repair bay, it is not uncommon for a pallet truck to be moved from a loading/unloading task to a transfer task or vice-versa. This can also occur when additional pallet trucks are needed to deal with higher than normal amounts of inbound or outbound goods or to deal with higher than normal amounts of goods to be transferred between loading docks, storage locations, redistribution locations and the like. In this case, it is typically necessary to adjust the spring stiffness of the height-adjustable industrial caster wheel and may be necessary or desirable to adjust the height of the caster wheel to the different use.

In the height-adjustable industrial caster wheels disclosed in the incorporated 161 and 319 patents, it is relatively difficult to make these adjustments. While it is possible to make some of these adjustments by lying on the ground and reaching under the pallet truck, it is often necessary to make some or all of these adjustments by taking a given pallet truck off line and moving it into the repair bay. In the repair bay, the pallet truck can be raised on a lift to allow a user to access the height-adjustable industrial caster wheels from underneath the pallet truck. However, this is time consuming even under the best circumstances, which will be worse if a free lift and/or maintenance worker are not available in the repair bay. If the height-adjustable industrial caster wheels are not height adjustable, accessing them with the pallet truck lifted off the ground is typically necessary, so that spacing blocks or shims can be added or removed.

Many models of pallet trucks have access panels in there corners to allow the operator to access the height-adjustable industrial caster wheels from above, without needing to take a given pallet truck off-line. Thus, it would desirable if the height of the height-adjustable industrial caster wheels were adjustable without needing to take a given pallet truck off line. It would be even more desirable if the height of the height-adjustable industrial caster wheels could be adjusted when accessing them through the panels provided in the floor of the pallet truck.

This invention provides a height-adjustable industrial caster wheel.

This invention separately provides a height-adjustable industrial caster wheel that has the height adjusting mechanism accessible at a top surface of the height-adjustable industrial caster wheel.

This invention separately provides a height-adjustable industrial caster wheel that can be adjusted by accessing the top surface of the height-adjustable industrial caster wheel.

This invention separately provides a height-adjustable industrial caster wheel that can be adjusted when accessed through an access panel of a pallet truck.

This invention separately provides a height-adjustable industrial caster wheel that can use mechanical, hydraulic, pneumatic and/or other height adjusting systems, mechanisms or devices.

This invention separately provides a height-adjustable industrial caster wheel that includes a seal and/or protective member usable to isolate the height adjusting system, mechanism or device from the surrounding environment.

This invention separately provides an industrial caster wheel having a lubrication port for a swivel bearing system, mechanism or device that is accessible at the top surface of the industrial caster wheel.

This invention separately provides an industrial caster wheel having one or more leading edge members extending in a forward travel direction of the industrial caster wheel and having ramped or sloped bottom surface(s) that engage certain upwardly extending offsets in a support surface prior to most other elements of the industrial caster wheel.

In various exemplary embodiments of the height-adjustable industrial caster wheel according to this invention, an industrial caster wheel includes a mounting plate, a swivel assembly, and a spring housing. In various exemplary embodiments, the swivel assembly interacts with one of the mounting plate and the spring housing to form a swivel mechanism that allows the spring housing to rotate or swivel about an axial, typically vertical, axis relative to the mounting plate. In various exemplary embodiments, the other of the mounting plate and the spring housing is movable relative to the swivel assembly between a fully extended position and a fully lowered position to adjust the height of the height-adjustable industrial caster wheel. In various exemplary embodiments, the one of the mounting plate and the spring housing is threadably attached to the swivel assembly, such that the height can be adjusted by screwing and unscrewing the swivel assembly onto the spring housing.

In some such exemplary embodiments, a bolt extends into the spring housing and engages the swivel assembly to maintain the relative position between the spring housing and the swivel assembly. In various exemplary embodiments, the bolt extends into a top surface of the spring housing and engages a top portion of the swivel assembly. In various exemplary embodiments, engagable structures are provided in or on the top surfaces of the spring housing and the swivel assembly. Consequently, the height of the height-adjustable industrial caster wheel can be unlocked, adjusted and relocked by accessing the height-adjustable industrial caster wheel from above, eliminating the need to raise the pallet truck (or other device the height-adjustable industrial caster wheel is attached to) away from the floor to be able to access and adjust the height-adjustable industrial caster wheel.

In various other exemplary embodiments of the height-adjustable industrial caster wheel according to this invention, the one of the mounting plate and the spring housing combines with the swivel assembly to form a hydraulic or pneumatic fluid space, such that the height can be adjusted by selectively adding or removing a hydraulic or pneumatic fluid from the hydraulic or pneumatic fluid space. In some such exemplary embodiments, a hydraulic or pneumatic fluid supply device associated with the pallet truck or other device the height-adjustable industrial caster wheel is attached to includes a fluid supply hose that is detachably connected to a fluid supply fitting that is located on a top surface of the mounting plate. The fluid supply fitting is fluidly connected to the hydraulic or pneumatic fluid space by a passage extending through the mounting plate or the swivel assembly. In operation, the user manipulates controls on the pallet truck or other device to supply fluid from a fluid reservoir of the fluid supply device to the fluid space and withdraw fluid from the fluid space back into the fluid reservoir to adjust the height of the height-adjustable industrial caster wheel. Still other exemplary embodiments can use hydraulic or pneumatic height-adjusting systems that have both the fluid space and the fluid reservoir contained within the height-adjustable industrial caster wheel itself.

In various exemplary embodiments of the height-adjustable industrial caster wheel according to this invention, a height-adjustable industrial caster wheel includes a seal and/or protective member usable to isolate the height adjusting system, mechanism or device from the surrounding environment. For some such height-adjustable industrial caster wheels having two relatively-displaceable threaded elements, the seal and/or protective member is a shroud mounted to one relatively displaceable element. The shroud extends over and slides relatively to an outer surface of the other relatively displaceable element. For other such height-adjustable industrial caster wheels having two relatively-displaceable threaded elements, the seal and/or protective member is an expandable bellows that is mounted to both relatively displaceable elements. For some such height-adjustable industrial caster wheels having a hydraulic or pneumatic fluid space, the seal and/or protective member includes at least one O-ring and/or other fluid-tight structure, device or mechanism provided between the two relatively displaceable elements. For other such height-adjustable industrial caster wheels having a hydraulic or pneumatic fluid space, the seal and/or protective member includes an expandable bellows. The bellow forms a portion of the hydraulic or pneumatic fluid space. End portions of the bellows are mounted to both relatively displaceable elements and include O-rings and/or other fluid-tight structures, devices or mechanisms.

In various exemplary embodiments of an industrial caster wheel according to this invention, the industrial caster wheel includes a swivel bearing system that allows the swivel assembly to rotate relatively to one of the mounting plate and the spring housing. A lubrication passage from the swivel bearing system extends through one of the mounting plate or the swivel assembly from a top surface of that element and fluidly connects the bearing system to that top surface. A lubrication port having a lubrication fitting is formed in/at the top of the lubrication passage at that top surface such that the lubrication fitting is accessible to a maintenance worker from above the industrial caster wheel. This allows the maintenance worker to connect a hose to the lubrication fitting and supply lubrication material to the swivel bearing system through an access opening in the pallet truck or other device the industrial caster wheel is attached to.

The industrial caster wheel, as it moves with the pallet truck or other device it is attached to, is oriented so that a front surface of the spring housing faces the direction in which the pallet truck or other device is moving and the wheel assembly is behind the spring housing. In various exemplary embodiments of an industrial caster wheel according to this invention, the industrial caster wheel has one or more leading edge members that are located forward of that front surface of the spring housing and that have ramped or sloped bottom surface (s). In various exemplary embodiments, each side plate includes a leading edge member. In various other exemplary embodiments, the one or more leading edge members are attached to or are portions of the front surface of the spring housing.

In operation, the pallet truck or other device the industrial caster wheel is attached to travels over a support surface, which often has one or more upwardly extending offsets. As each industrial caster wheel having one or more leading edge members approaches and passes over a sufficiently-high upwardly extending offset in the support surface, the ramped or sloped bottom surface(s) of the one or more leading edge members contacts the top edge and/or surface of that offset before most or any of the other elements of the industrial caster wheel. Those ramped or sloped bottom surface(s) gradually raise that industrial caster wheel relative to that offset, such that the spring housing and/or the wheel assembly are able to more easily pass over that offset with less shock or impact on that industrial caster wheel and thus on that pallet truck or other device and any objects on that pallet truck or other device.

These and other features and advantages of this invention are described in or are apparent from the following detailed description of the preferred embodiments.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
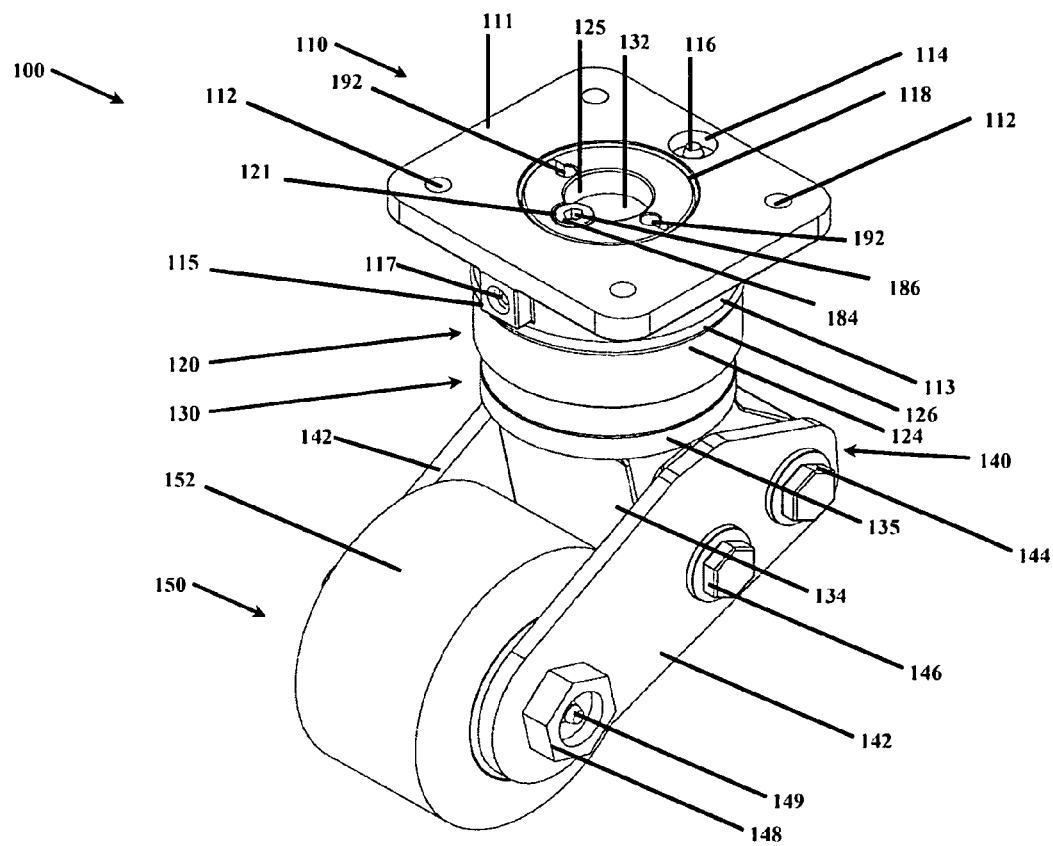
FIG. 1 is an isometric view of a first exemplary embodiment of a height-adjustable industrial caster wheel according to this invention.
Figure 2:
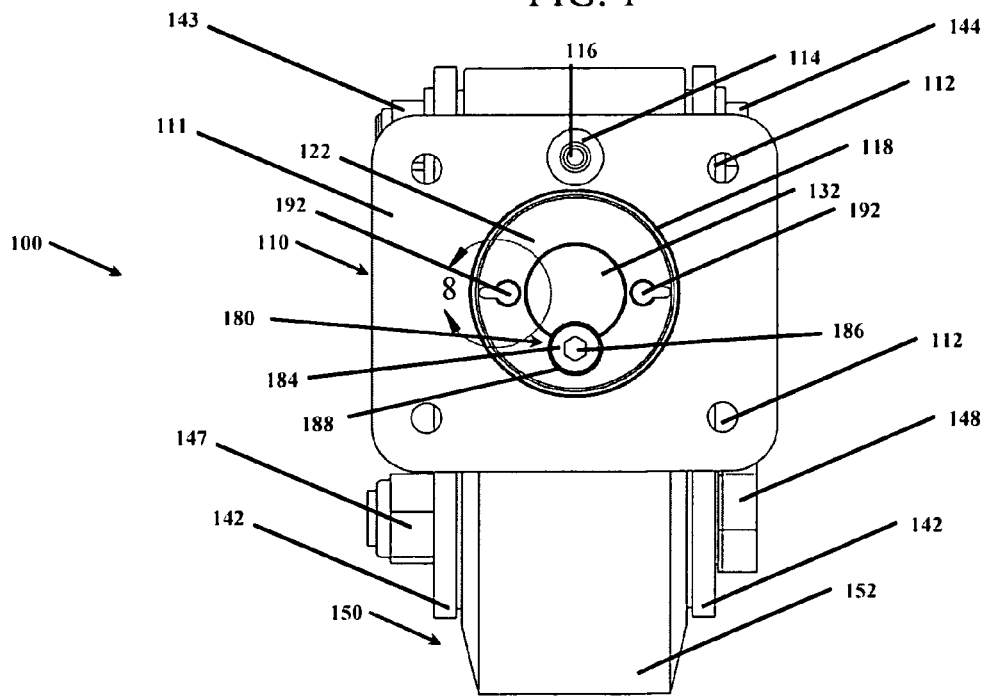
FIG. 2 is a top plan view of the height-adjustable industrial caster wheel shown in FIG. 1.
Figure 3:
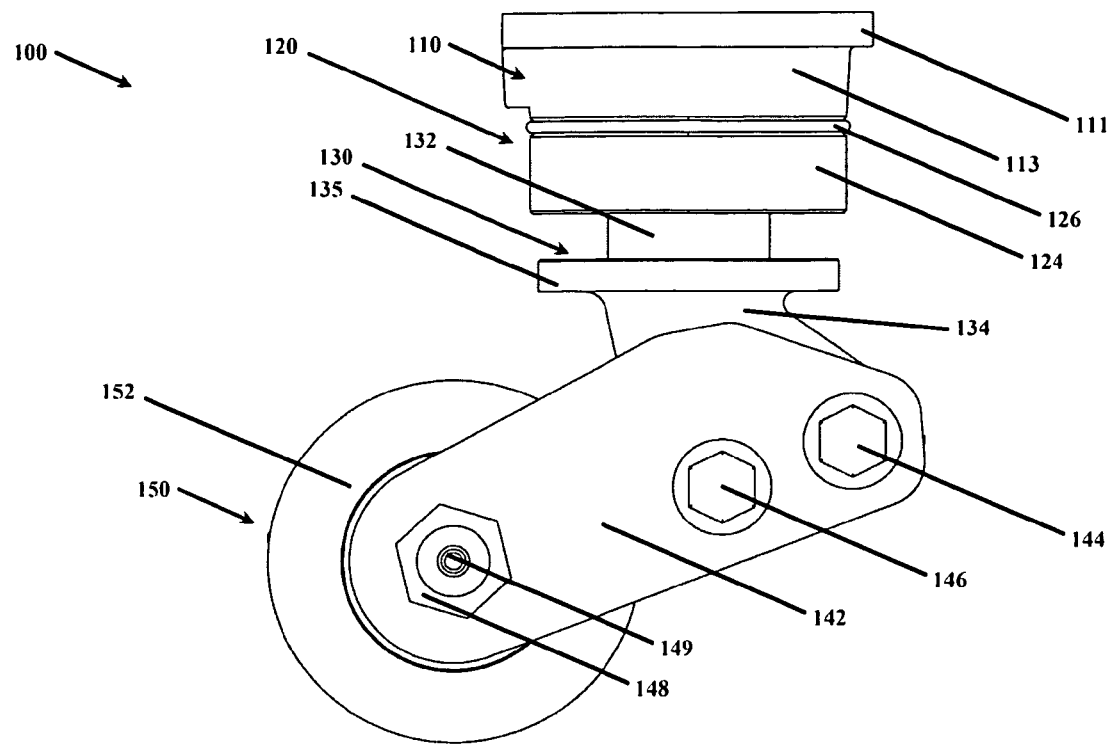
FIG. 3 is a side plan view of the height-adjustable industrial caster wheel shown in FIG. 1.
Figure 4:
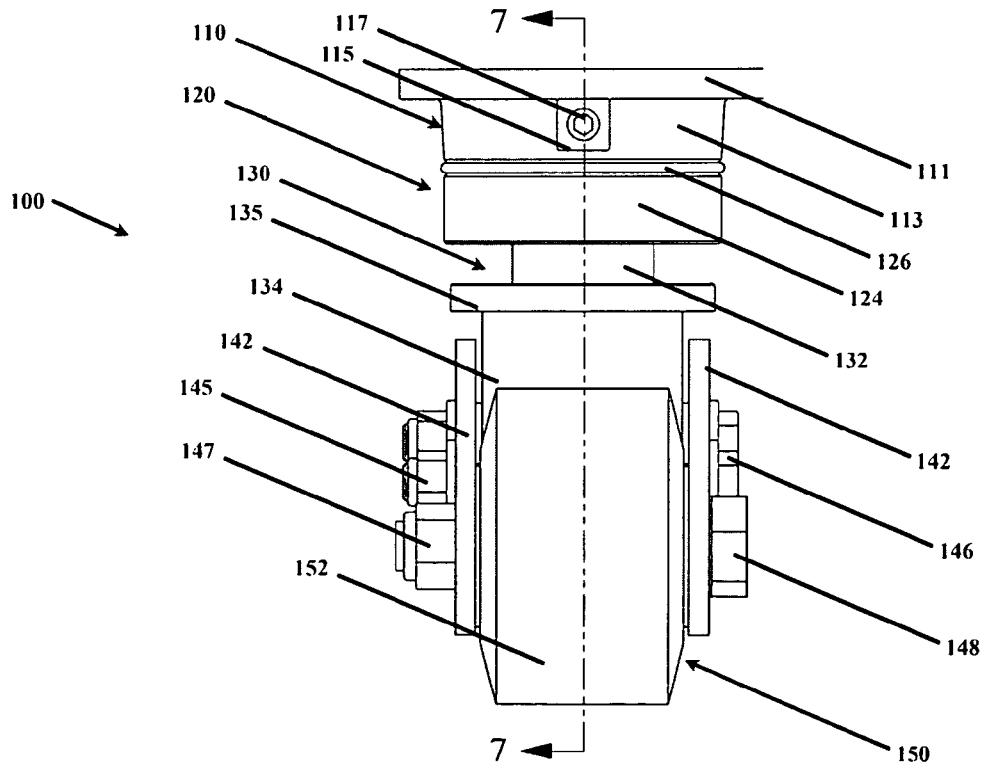
FIG. 4 is a front plan view of the height-adjustable industrial caster wheel shown in FIG. 1.

The various features of the height-adjustable industrial caster wheels described herein are combinable with the various features of the spring-force adjustable industrial caster wheels described in copending U.S. patent application Ser. No. 13/085,593 and/or the various features of the improved spring members described in copending U.S. patent application Ser. No. 13/085,640, both filed on even date with this application and each incorporated herein by reference in its entirety.

FIGS. 1-14 illustrate a first exemplary embodiment of a height-adjustable industrial caster wheel 100 according to this invention. As shown in FIGS. 1-14, the height-adjustable industrial caster wheel 100 includes a mounting base 110, a swivel assembly 120, a height-adjustable spring housing 130, a side plate assembly 140, and a caster wheel assembly 150. As shown in varying levels of detail in FIGS. 1-8, the mounting base 110 includes a top mounting plate 111. A plurality of holes 112 are provided in the top mounting plate 111 and are usable to mount the mounting base 110 to an object, such as a pallet truck. The mounting base 110 also includes a small first recess 114 and a larger central passage 118 in the top mounting plate 111. A lubrication fitting 116 is screwed into the internally threaded first recess 114.

As shown in FIGS. 1-4, an annular bottom member 113 of the mounting base 110 extends downwardly away from the top mounting plate 111. The outer surface of the annular bottom member 113 is typically cylindrical, although it can be any appropriate shape. A ball bearing passage 115 extends horizontally through the annular bottom member 113. A plug screw 117 is screwed into the internally-threaded ball bearing passage 115. An annular top portion 122 (see FIGS. 5-7) of the swivel assembly 120 extends upwardly into the interior space defined by the annular bottom member 113, while an annular bottom portion 124 of the swivel assembly 120 is separated from the bottom portion 113 by an O-ring 126.

A top portion 132 of the height-adjustable spring housing 130 extends upwardly inside of the annular bottom portion 113 and the annular top and bottom portions 122 and 124 of the swivel assembly 120, and is connected to the swivel assembly 120. A bottom portion 134 of the height-adjustable spring housing 130 houses a solid elastomeric spring member (see FIGS. 5-7) and provides a mounting structure for the side plate assembly 140. A flange 135 extends outwardly from the height-adjustable spring housing 130 between the top and bottom portions 132 and 134.

As shown in FIGS. 1-4, the side plate assembly 140 includes a pair of side plates 142 that are fastened to the bottom portion 134 of the height-adjustable spring housing 130. The side plates 140 also carry the caster wheel assembly 150. In particular, a first fastener 144 extends through holes or passages provided in the side plates 142 and the bottom portion 134 of the height-adjustable spring housing 130. The first fastener 144 is connected to a first nut or other securing device 143 to securely fasten the side plates 142. The first fastener 144 also forms an axel or pivot point around which the side plate assembly 140 can rotate in response to the caster wheel 150 travelling over uneven surfaces, across thresholds and other bumps, dips and the like, and/or in response to changes in the load placed on the height-adjustable industrial caster wheel 100.

Figure 5:
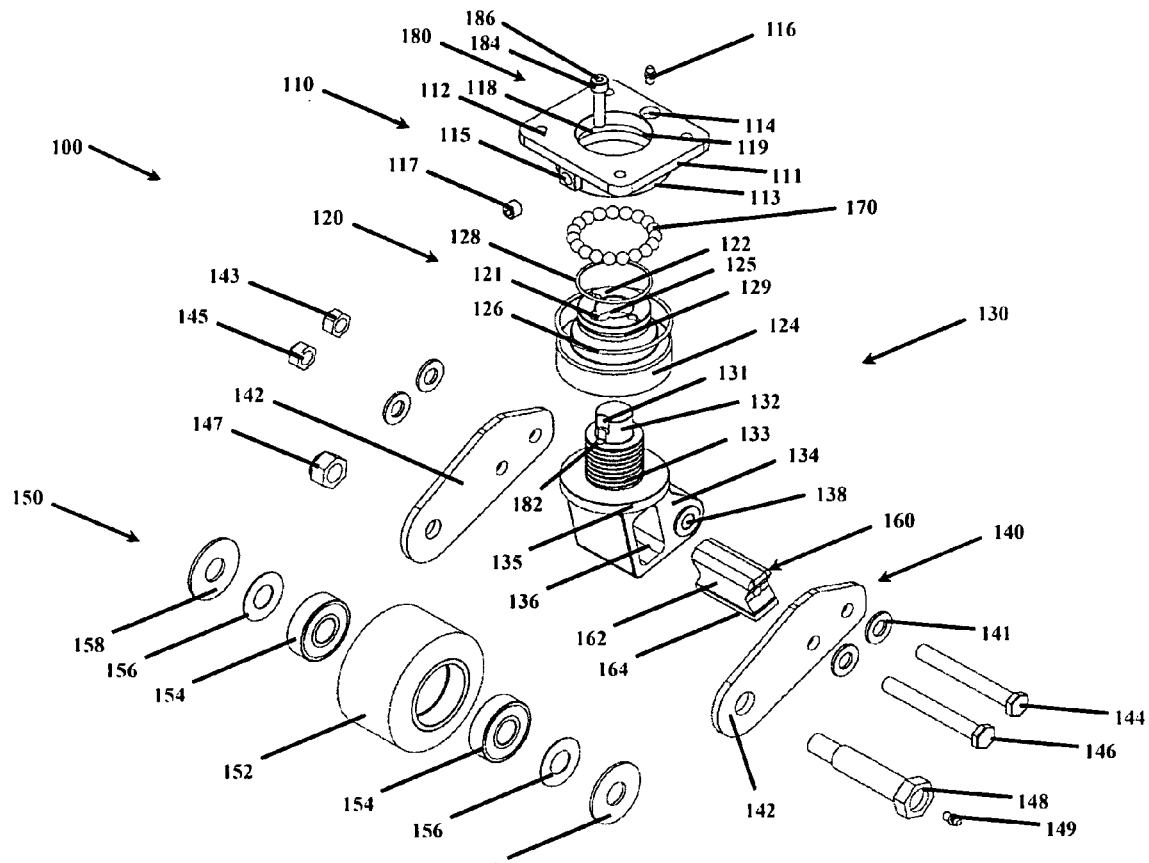
FIG. 5 is an exploded view of the height-adjustable industrial caster wheel shown in FIG. 1.
Figure 6:
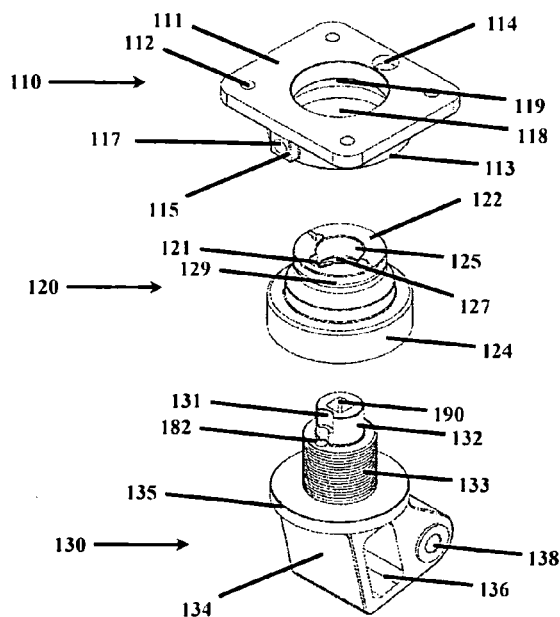
FIG. 6 is a partial exploded view of the height-adjustable industrial caster wheel shown in FIG. 1 showing the height-adjusting mechanism in greater detail.
Figure 7:
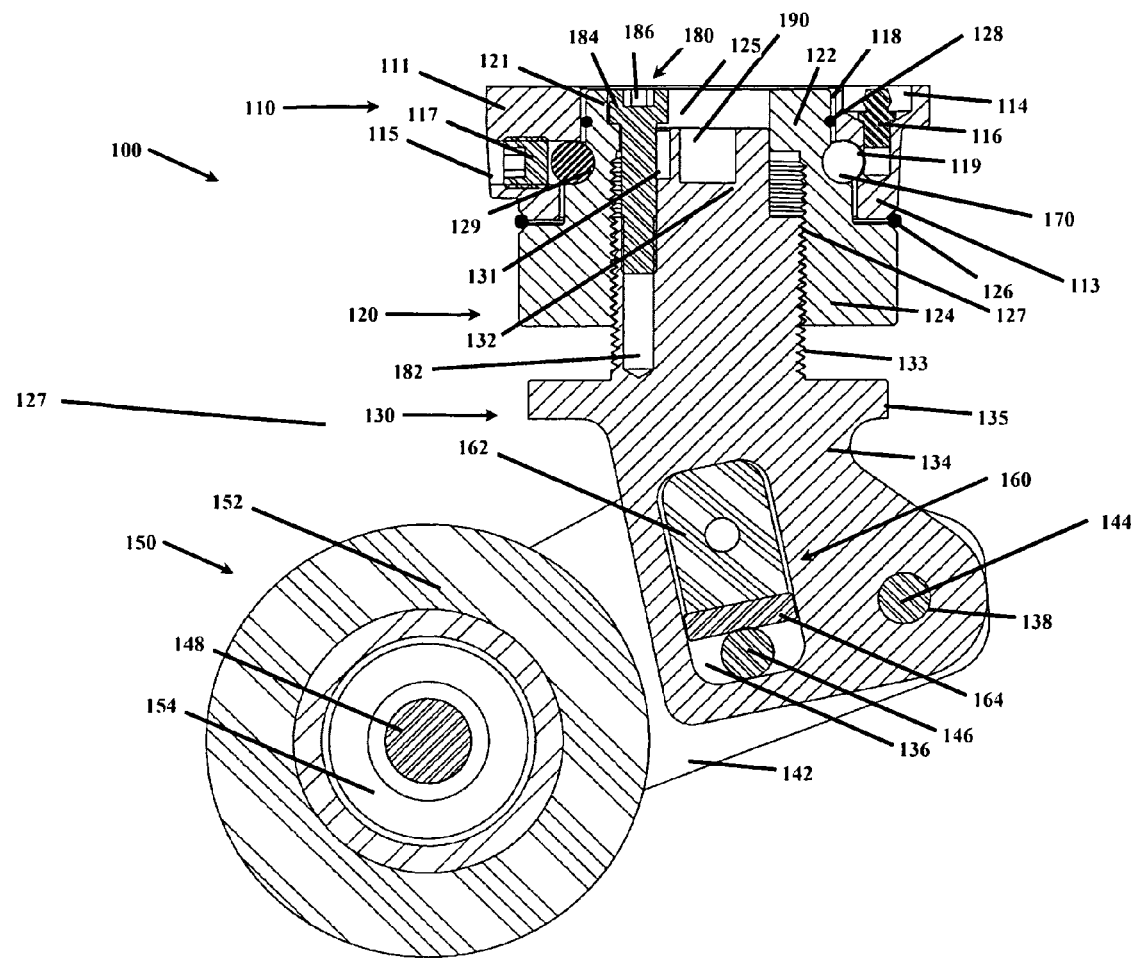
FIG. 7 is a vertical cross-sectional view through the height-adjustable industrial caster wheel shown in FIG. 1.

A second fastener 146 extends through holes or passages provided in the side plates 142 and through a spring member chamber provided within the bottom portion 134 of the height-adjustable spring housing 130 (see FIGS. 5-7). The second fastener 146 is located so that it is adjacent to the elastomeric spring member. The second fastener 146 is connected to a second nut or other securing device 145 to secure it to the side plates 142. The second fastener 146 bears against the spring member 162 and compresses and releases the spring member 162 as the side plate assembly 140 rotates around the first fastener 144.

A third fastener 148 extends through holes or passages provided in the side plates 142 and through the center of the caster wheel assembly 150. The third fastener 148 is connected to a third nut or other securing device 147 to secure it and the caster wheel assembly 150 to the side plates 142. In particular, third fastener 148 forms an axel or pivot point around which the caster wheel assembly 150 can rotate. A lubrication fitting 149 is provided in one end of the third fastener 148 to allow the caster wheel assembly 150 to be easily lubricated without having to disassemble the industrial caster wheel 110 or remove it from the pallet truck or other object it is attached to.

FIG. 5 shows a fully exploded view of the height-adjustable industrial caster wheel 100 shown in FIGS. 1-4, while FIG. 6 is a partially exploded view of the mounting base 110, the swivel assembly 120 and height-adjustable spring housing 130. FIG. 7 is a side cross-sectional view of the height-adjustable industrial caster wheel 100 taken along line 7-7 shown in FIG. 4. In particular, FIGS. 5-7 show one exemplary embodiment of a height adjusting mechanism according to this invention.

As shown in FIGS. 5-7, the mounting base 110 rests on top of and extends around the annular top portion, i.e., a swivel bearing member 122, of the swivel assembly 120. In particular, the swivel bearing member 122 extends into the central passage 118, which extends through both the top mounting plate 111 and the annular bottom member 113. A channel 119 is formed in the inner surface of the central passage 118, while a corresponding channel 129 is formed in the outer surface of the swivel bearing member 122. As shown in FIG. 7, when the swivel bearing member 122 is inserted into the central passage 118, the two channels 119 and 129 face each other and form a bearing race. As shown in FIGS. 5 and 7, when a number of ball bearings 170 are inserted through the ball bearing passage 115 sufficient to fill the bearing race, the swivel bearing member 122 is locked into the central passage 118, such that the swivel assembly 120 is secured to the mounting base 110. The ball bearings 170 are then secured into the bearing race by screwing the plug screw 117 into the ball bearing passage 115.

The ball bearings 170 allow the swivel assembly 120 to rotate freely relative to the mounting base 110 about a vertical axis. The first O-ring 126 and a second O-ring 128 are also located between the swivel bearing member 122 and the central passage 118. The first and second O-rings 126 and 128 seal the gap between the swivel bearing member 122 and the central passage 118, ideally preventing any lubrication for the ball bearings 170 that is inserted into the gap through the lubrication fitting 116 from escaping from the gap.

A static load is applied to the industrial caster wheel 100 by the pallet truck (or other object being supported by that industrial caster wheel 100). Similarly, a dynamic load is applied to the industrial caster wheel 100 in response to changes in the surface the industrial caster wheel 100 is travelling over, in response to accelerations and changes in direction as the industrial caster wheel 100 moves over that surface and/or in response to shifts by and/or changes in objects carried by the pallet truck or the other supported object. In particular, these static and dynamic loads are transmitted through the industrial caster wheel 100 between the pallet truck or the other supported object and the supporting surface along that vertical axis of the industrial caster wheel 100. When the industrial caster wheel 100 is below the pallet truck or other supported object, that vertical axis can also be the vertical direction.

As discussed above with respect to FIGS. 1-7, when the swivel bearing member 122 is inserted into the central passage 118, the two channels 119 and 129 face each other to form a bearing race for the ball bearings 170. It should be appreciated that, in various exemplary embodiments, such as that shown in FIGS. 1-7, the location of the parting line between the two channels 119 and 129, and thus the shapes of the two channels 119 and 129, is specifically chosen so that these static and dynamic loads are transmitted at least primarily, preferably substantially, and ideally entirely, along that vertical axis through the ball bearings 170 between the mounting base 110 and the swivel member 120. As shown in FIGS. 5-7, in such exemplary embodiments, the parting line is located so that the channel 119 extends substantially over the ball bearings 170, while the channel 129 extends substantially under the ball bearings 170.

At the same time, the parting line is also located so that each of the channels 119 and 129 also extends past the ball bearings' equators (relative to that vertical axis). During (re-) assembly, after the annular top portion 122 of the swivel assembly 120 is inserted into the annular bottom member 113 of the mounting base 110, the ball bearings 170 are inserted into the raceway formed by the channels 119 and 129. Once inserted into the raceway, the ball bearings 170 securely lock the mounting base 110 and the swivel assembly 120 together. That is, once the ball bearings 170 are inserted into the raceway formed by the channels 119 and 129, the annular top portion 122 of the swivel assembly 120 cannot be withdrawn from the annular bottom member 113 of the mounting base 110, due to the interference between the ball bearings 170 and the equator-crossing portions of the channels 119 and 129. At the same time, notwithstanding those equator-crossing portions of the channels 119 and 129, the load forces are transmitted between the mounting base 110 and the swivel assembly 120 through the ball bearings 170 at least primarily along the vertical axis of the industrial caster wheel 100.

It should also be appreciated that appropriate lubrication, such as grease or the like, is introduced into the raceway formed by the channels 119 and 129 through the lubrication fitting 116 that is screwed into the internally threaded first recess 114. In previously commercially available industrial caster wheels, the lubrication port was typically provided below the mounting structure used to attach such previously commercially available industrial caster wheels to the object to be supported. Depending on the design of such previously commercially available industrial caster wheels, the lubrication port would be provided in either the underside of the mounting structure, a bottom channel-carrying portion of the industrial caster wheel or the like. Because of where the lubrication port is located in such previously commercially available industrial caster wheels, supplying new lubrication to the ball bearings requires accessing such a lubrication port from beneath the pallet truck or the other supported object. This, in turn, requires the maintenance personnel to either place the pallet truck or the other supported object on a lift, position the pallet truck or the other supported object over a grease pit or the like, or place themselves on the ground so they can reach under the pallet truck or the other supported object.

In contrast, in various exemplary embodiments according to this invention, the lubrication port 114 and lubrication fitting 116 are provided on a top surface of the top mounting plate 111, By placing the lubrication port 114 and lubrication fitting 116 in the top surface of the top mounting plate 111, maintenance personnel can connect a lubrication gun or tube to the lubrication fitting 116 using the access panel provided in certain pallet trucks and other supported objects, as discussed herein. It should additionally be appreciated that the structures of the channels 119 and 129 and the location of the parting line between the channels 119 and 129 facilitate the ability to provide the lubrication port 114 in the top surface of the top mounting plate 111. For example, as shown in FIG. 7, a bottom portion of the lubrication port 114 intersects the channel 119. Thus, when new lubrication is introduced into the bottom portion of the lubrication port 114, that new lubrication readily flows into the raceway and around the ball bearings 170.

It should further be appreciated that the exemplary embodiment of the channels 119 and 129 and the location of the lubrication port 114 and lubrication fitting 116 can be incorporated into an industrial caster wheel independently of, i.e., without also including, the height-adjusting features disclosed herein. Furthermore, in some such exemplary embodiments, the top portion 122 of the swivel assembly 120 does not need to be annular. It should be additionally appreciated that, in other such exemplary embodiments, the top annular portion 122 of the swivel assembly 120 is radially outside of the annular bottom portion 113 of the mounting base 110. Additionally, it should be appreciated that, in some such exemplary embodiments having a radially outward top annular portion 122, the radially inward bottom portion 113 is not annular.

As indicated above, the top portion 132 of the height-adjustable spring housing 130 extends into the swivel bearing member 122 of the swivel assembly 120. As shown in greater detail in FIGS. 5-7, the top portion 132 is located above a threaded portion 133, which itself is located above the flange 135. In particular, the top portion 132 extends through a second central passage 125 formed in the swivel bearing member 122 and the bottom portion, i.e., the height adjusting member 124, of the swivel assembly 120, while the threaded portion 133 extends into the second central passage 125. As shown in FIG. 7, the threaded portion 133 engages a correspondingly threaded portion 127 of the second central passage 125, such that the height-adjustable spring housing 130 can be screwed into and out of engagement with the swivel assembly 120.

By rotating the swivel assembly 120 clockwise and counterclockwise (as viewed from above the mounting base 110) relative to the height-adjustable spring housing 130, the threaded portion 133 moves axially into and out of the second central passage 125, respectively. This moves the height-adjustable spring housing 130 relatively closer to or farther away from the swivel assembly 120 and the mounting base 110, thus changing the height (e.g., the distance between the top surface of the mounting plate 110 and the contact point of the castor wheel 150) of the height-adjustable industrial caster wheel 100.

As shown in FIGS. 5-7, the bottom portion 134 of the height-adjustable spring housing 130 includes a spring space 136 into which an elastomeric spring 160 is placed. The elastomeric spring 160 comprises an elastomeric member 162 and a rigid plate 164 that is attached to the elastomeric member 162. The bottom portion 134 of the height-adjustable spring housing 130 also includes a pivot passage 138. The fastener 144 passes through the pivot passage 138, which allows the fastener 144, and thus the side plates 142, the fasteners 146 and 148 and the caster wheel 150, to pivot or rotate relative to the rest of the height-adjustable industrial caster wheel 100.

As shown in FIGS. 5-7, the elastomeric spring 160 sits on the fastener 146 within the spring space 136. In particular, the fastener 146 rests against the rigid plate 164. The elastomeric member 162 is compressed between the rigid plate 164 and the top of the spring space 136 when the fastener 146 rotates upwardly or clockwise against the rigid plate 164. The top edges of the side plates 142, in conjunction with the flange 135, provide a deflection stop when the height-adjustable industrial caster wheel 100 is under full deflection. That is, the top edges of the side plates 142 contact the flange 135 to define the full deflection of the height-adjustable industrial caster wheel 100.

FIGS. 5-7 further illustrate a number of exemplary mechanisms that allow the swivel assembly 120 to be readily rotated relative to the height-adjustable spring housing 130 and the relative positions of the swivel assembly 120 and the height-adjustable spring housing 130 to be secured, and which can be accessed from above the mounting plate 110. As indicated above, relevant movable objects to which the industrial caster wheel 100 is attached, such as, for example, pallet trucks, have access passages provided in the support deck that allow an operator or maintenance person to access the top surfaces of any attached casters. These adjusting and locking mechanisms, because they can be accessed through the access passages from above the mounting plate 110, allow an operator or maintenance worker to adjust the height of the height-adjustable industrial caster wheel 100 without having to take the movable object, pallet truck or the like off the line, let alone without having to move the movable object, pallet truck or the like into a maintenance bay or the like.

It should be appreciated that, in some relevant movable objects to which the industrial caster wheel 100 is attached, such as a pallet truck, the access passages are simply open or uncovered openings in the support deck of that movable object, which is typically, but not necessarily, an otherwise solid continuous surface. In other movable objects, the access passages are openings in the support deck that are covered by a mat that is placed on and covers at least a part of the support deck. In yet other movable objects, the access passages include associated cover plates or the like that are removably inserted into or secured over the access passages. In still other movable objects, the access passages include hinged covers or the like. In other movable objects, the support deck is an open lattice, with the access passages being those lattice openings over and/or adjacent to the attached industrial caster wheels. In some such movable objects, the open lattice is at least partially covered with one or more mats, one or more cover plates or the like.

As shown in FIGS. 5-7, one exemplary embodiment of a top-access locking mechanism according to this invention comprises a bolt 180 that is screwed into a threaded passage 182 formed in the interior of the threaded portion 133 of the height-adjustable spring housing 130, along with a first notch 121 formed in the swivel bearing member 122 and a second notch 131 formed in the top portion 132 of the height-adjustable spring housing 130. The bolt 180 has a circular, radially-extending head 184. The notches 121 and 131 each form a portion of a circle such that, when the notches 121 and 131 are brought into opposing positions, a circular recess 188 is formed that is sized so that the circular, radially-extending head 184 of the bolt 180 will fit into that recess 188 as the bolt 180 is screwed into the threaded passage 182.

In particular, the notches 121 and 131 are preferably sized so that the circular, radially-extending head 184 fits closely to the sides of the notches. Consequently, when the bolt 180 is screwed deeply enough into the threaded passage 182 such that the circular, radially-extending head 184 has been at least partially drawn into the recess 188, it is no longer possible to rotate the swivel assembly 120 relative to the height-adjustable spring housing 130. That is, since the passage 182 is formed in the interior of the top portion 132 of the height-adjustable spring housing 130, it remains stationary as the swivel assembly 120, and thus the notch 121, are rotated about the height-adjustable spring housing 130 to adjust the height of the height-adjustable industrial caster wheel 100. In contrast, when circular, radially-extending head 184 is at least partially within the recess 188, the sides of the notch 121 engage the circular, radially-extending head 184, preventing the swivel assembly 120 from rotating relative to the height-adjustable spring housing 130. This in turn locks the height-adjustable industrial caster wheel 100 at its current height.

However, it should be appreciated that a close fit is not required, so long as the circular, radially-extending head 184 cannot readily be dislodged from at least the notch 121 once it is drawn sufficiently into the recess 188. Similarly, it should be appreciated that, if the inner surface of the second central passage 125 is closer to the outer surface of the top portion 132 than the diameter of the bolt 180, the swivel assembly 120 will not be able to rotate relative to the height-adjustable spring housing 130 any time the bolt 180 is in the threaded passage 182. In this situation, even a rough fit between the notch 121 and the circular, radially-extending head 184 may not be required. Alternatively, providing a fit between the notch 121 and the circular, radially-extending head 184 such that the circular, radially-extending head 184 cannot readily be dislodged from at least the notch 121 once it is drawn sufficiently into the recess 188 means that a looser fit between the inner surface of the second central passage 125 and the outer surface of the top portion 132 can be used.

In the exemplary embodiment shown in FIGS. 1-7, the radially-extending head 184 has a hexagonal recess 186. The hexagonal recess is sized, both in diameter and depth, to allow a standard sized hex key to be securely inserted in to the hexagonal recess 186 such that that hex key can be used to screw the bolt 180 into and out of the passage 182, as well as to tighten the bolt 180 against the bottom of the recess 188 and loosen the bolt 180.

Of course, it should be appreciated that other structures can be provided in (or to) the radially-extending head 184 in place of the hexagonal recess 186. These include recesses sized for slotted, Phillips or star (Torx) type screwdrivers and/or driver bits, and/or recesses sized for any other known or later developed driver tools usable to rotate the bolt 180. These also include square, hex, octagonal or similar polygonal posts extending from the radially-extending head 184 or axial extensions of the radially-extending head 184.

Similarly, the radially-extending head 184 and the notches 121 and 131 can use any set of generally to exactly corresponding shapes in place of the circular shapes discussed above. If only generally or roughly corresponding shapes are used, such as circular notches 121 and 131 with a hexagonally-shaped, radially-extending head 184, a minor amount of movement between the swivel assembly 120 and the height-adjustable spring housing 130 may be possible. However, since this would amount to a small fraction of a rotation at most, this does not affect the locking described above.

It should also be appreciated that, in place of the bolt 180, any other known or later-developed fastener, spike, elongated member or the like that can be used to selectively rotationally lock the height-adjustable spring housing 130 to the swivel assembly 120. That is, any known or later-developed fastener, spike, elongated member or the like, which can be moved between a locked position where it prevents the swivel assembly 120 from being rotated relative to the height-adjustable spring housing 130 and an unlocked position, can be used in place of the bolt 180.

Figure 8:
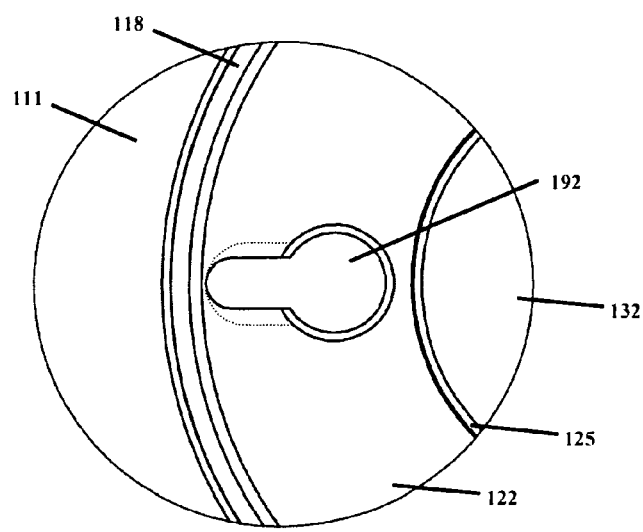
FIG. 8 is a top plan view of a top surface of the height-adjustable industrial caster wheel shown in FIG. 1 showing the adjusting interface mechanism used to adjust the height of the height-adjustable industrial caster wheel.

As shown in FIGS. 1, 2, 5 and 6, and as shown in greater detail in FIG. 8, one exemplary embodiment of a top-access adjusting mechanism according to this invention comprises threaded member 133 of the height-adjustable spring housing 130 and the swivel assembly 120, along with one or more engagable structures on each of the top portions 122 and 132. As described above, the swivel assembly 120 rotates freely relative to the mounting plate 110 and can be controllably rotated relative to the threaded member 133 to draw the threaded portion 133 into and to drive the threaded portion 133 out of the second central passage 125. As outlined above, this changes the position of the height-adjustable spring housing 130 relative to the swivel assembly 120 and thus the height of the height-adjustable industrial caster wheel 100.

As shown in FIGS. 1, 2, 5 and 6, a first engagable structure 190 is provided in the top surface of the top portion 132. In particular, one exemplary embodiment of the first engagable structure is a square-shaped recess 190 into which a holding member (not shown) can be inserted. This holding member is used by the operator or maintenance worker to hold the height-adjustable spring housing 130 stationary when the operator or maintenance worker adjusts the height of the height-adjustable industrial caster wheel 100.

Similarly, as shown in FIGS. 1, 2, 5, 6 and 8, a number of second engagable structures 192 are provided in the top surface of the top portion 122. In particular, in one exemplary embodiment, the second engagable structures are keyhole-type recesses 192 into which one or more turning members (not shown) can be inserted. These one or more turning members are used by the operator or maintenance worker to turn the swivel assembly 120 to adjust the height of the height-adjustable industrial caster wheel 100. These one or more turning members can be separate members that are each inserted into one of the keyhole-type recesses 192 and that are separately grasped by the operator or maintenance worker, or can be a single member with two or more legs that are each inserted into one of the keyhole-type recesses 192. In this latter case, that single member would typically include a handle that the operator or maintenance worker can grasp using one hand.

Of course, any other suitable known or later-developed engagable structures can be used in place of, or in addition to, the exemplary engagable structures 190 and 192 discussed above. Such other suitable known or later-developed engagable structures include, for example, other polygonal recesses, especially hex recesses, upwardly extending posts of any desired shape, especially hexagonal posts, and threaded holes and/or posts.

In various other exemplary embodiments, the first engagable structure 190 is omitted completely. In such exemplary embodiments, the height-adjustable spring housing 130 is held in position relative to the swivel assembly 120 by temporarily preventing any one or more of the wheel 150, any element or portion of the side plate assembly 140 or any element or portion of the height-adjustable spring housing 130 that is below the swivel assembly 120 from rotating with the swivel assembly 120. For example, one or more chocks, or other objects or impediments, can be placed adjacent to the wheel 150 and/or the side plate assembly 140, and/or one or more objects or other impediments can be placed between the wheel 150 and/or the side plate assembly 140 and an element of the pallet truck or other movable object that industrial caster wheel 100 is attached to.

As another example, an elongated member can be inserted through the access opening or an adjacent second opening such that that one or more of the wheel 150, any element or portion of the side plate assembly 140 or any element or portion of the height-adjustable spring housing 130 contacts the elongated member such that that elongated member interacts with at least the pallet truck to prevent the height-adjustable spring housing 130 from rotating. In yet another example, the pallet truck or other movable object can be located such that the wheel 150 is located in a recess, hole, depression or the like and bears against the sides of that recess, etc. to prevent the height-adjustable spring housing 130 from rotating. In any such exemplary embodiment, when a maintenance personnel attempts to adjust the height, one or more of the wheel 150, any element or portion of the side plate assembly 140 or any element or portion of the height-adjustable spring housing 130 that is below the swivel assembly 120 are interacted with to prevent the height-adjustable spring housing 130 from rotating with the swivel assembly 120 as the height is adjusted.

Furthermore, in exemplary embodiments where the first engagable structure 190 is completely omitted, it is not necessary that the top surface of the top portion 132 be accessible or visible to a user. Thus, in some such exemplary embodiments, the second central passage 125 does not extend entirely through the swivel assembly 120 and does not connect to the top surface 122 of the top portion 122. Furthermore, the notch 131 can be omitted from the top portion 132, with the notch 121 replaced with a third passage that extends through the top portion 122 into the second central passage 125. This third passage is aligned with the threaded passage 182. When the bolt 180 is inserted through the third passage and engages the threaded passage 182, it prevents the swivel assembly and the height-adjustable spring housing 130 from moving relative to each other, especially when the threaded passage 182 and the third passage are spaced away from the rotational axis, and/or the bolt 180 is tightened into the threaded passage 182 and/or against the top portion 122. Furthermore, in those exemplary embodiments where the third passage is spaced away from the rotational axis, the swivel member 120 can be rotated relative to the height-adjustable spring housing 130 using the bolt 180 while it is in only the third passage. In such exemplary embodiments, the second engagable structures 192 can also be, but need not be, omitted.

When the mounting base 110 is attached to a pallet truck or the like, the height-adjustable industrial caster wheel 100 supports at least a portion of the load of and on the pallet truck. The swivel assembly 120 transmits this load from the mounting base 110 to the height-adjustable spring housing 130 through the threaded surface 127 and the threaded portion 133, the elastomeric spring 160, and the fasteners 144, 146 and 148 to the caster wheel 150. Depending on the smoothness or unevenness of the surface the pallet truck or the like is moving over and the amount of play desired, the height-adjustable industrial caster wheel 100 may be adjusted so that the caster wheel 150 just touches the ground or may be adjusted so that the caster wheel 150 is spaced a desired distance from the ground. Similarly, as the drive wheel of a pallet truck wears, and thus shrinks in diameter, the height-adjustable industrial caster wheel 100 may be adjusted so that the caster wheel 150 again just touches the ground or may be adjusted so that the caster wheel 150 is spaced a desired distance from the ground.

Figure 9:
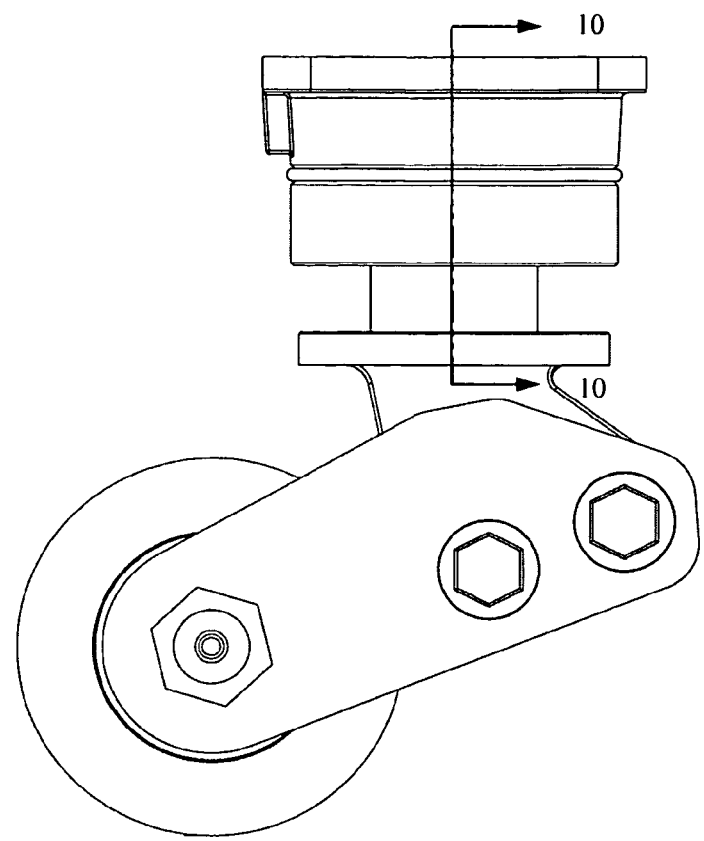
FIGS. 9 and 10 are, respectively, side plan and vertical cross-sectional views through the height-adjustable industrial caster wheel shown in FIG. 1 when it is in an extended position.
Figure 10:
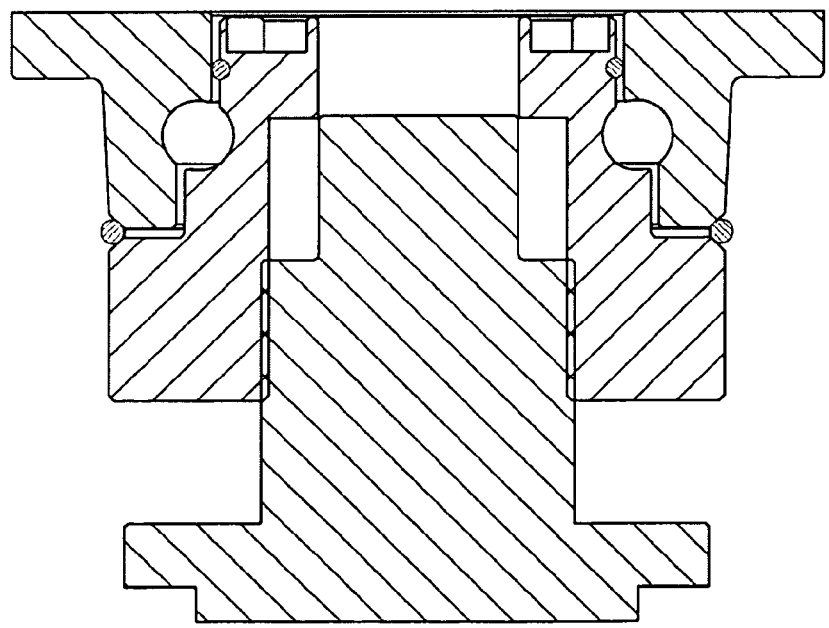
Figure 11:
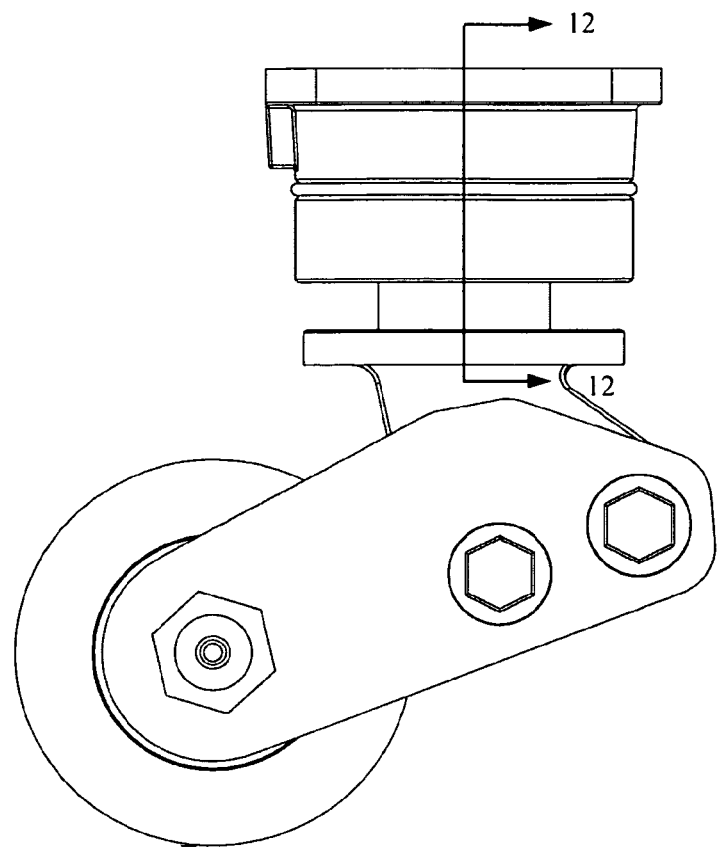
FIGS. 11 and 12 are, respectively, side plan and vertical cross-sectional views through the height-adjustable industrial caster wheel shown in FIG. 1 when it is in an intermediate position.
Figure 12:
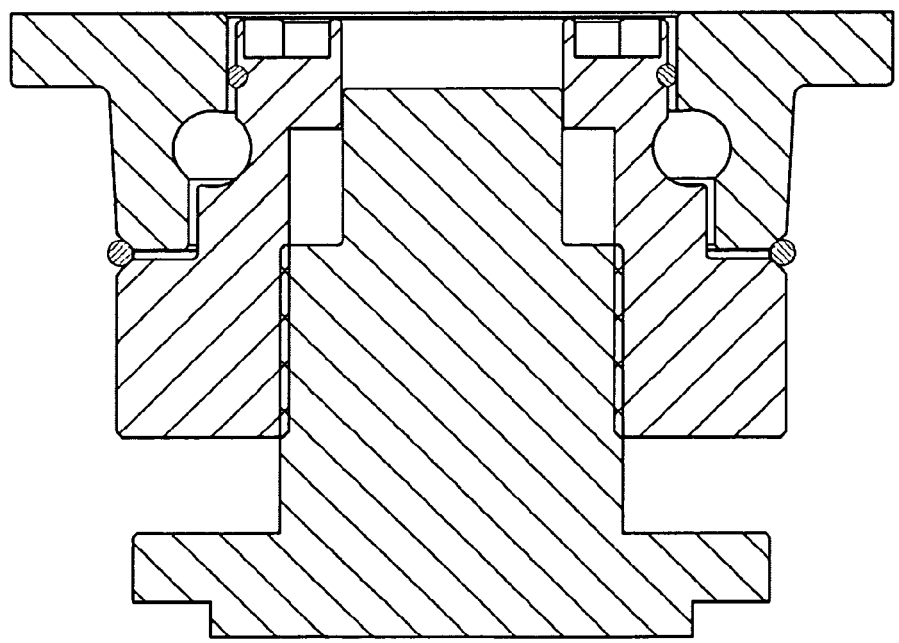
Figure 13:
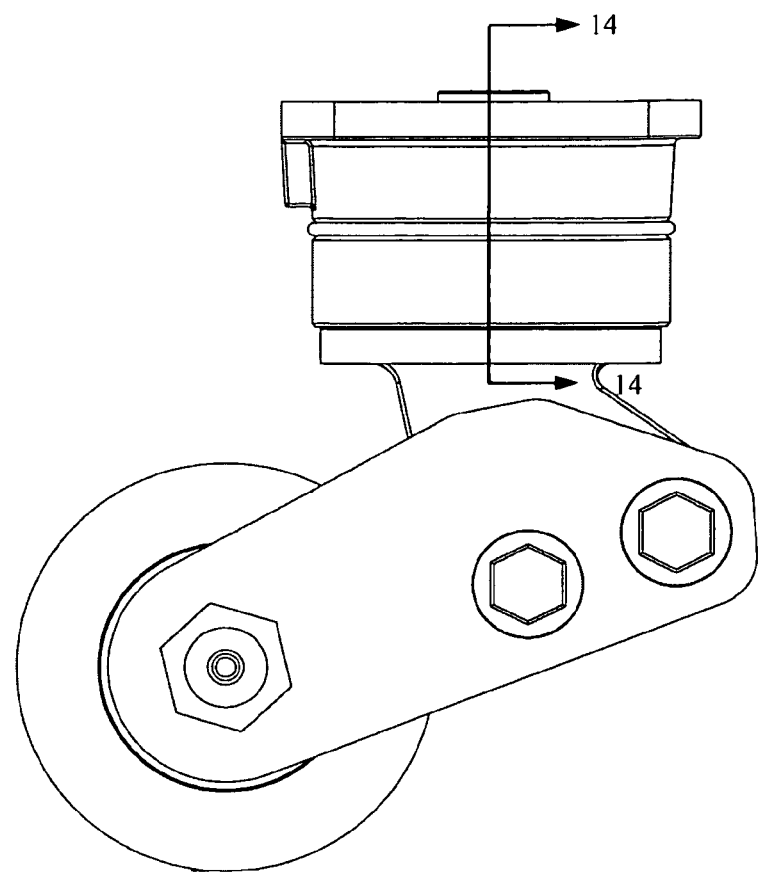
FIGS. 13 and 14 are, respectively, side plan and vertical cross-sectional views through the height-adjustable industrial caster wheel shown in FIG. 1 when it is in a lowered position.
Figure 14:
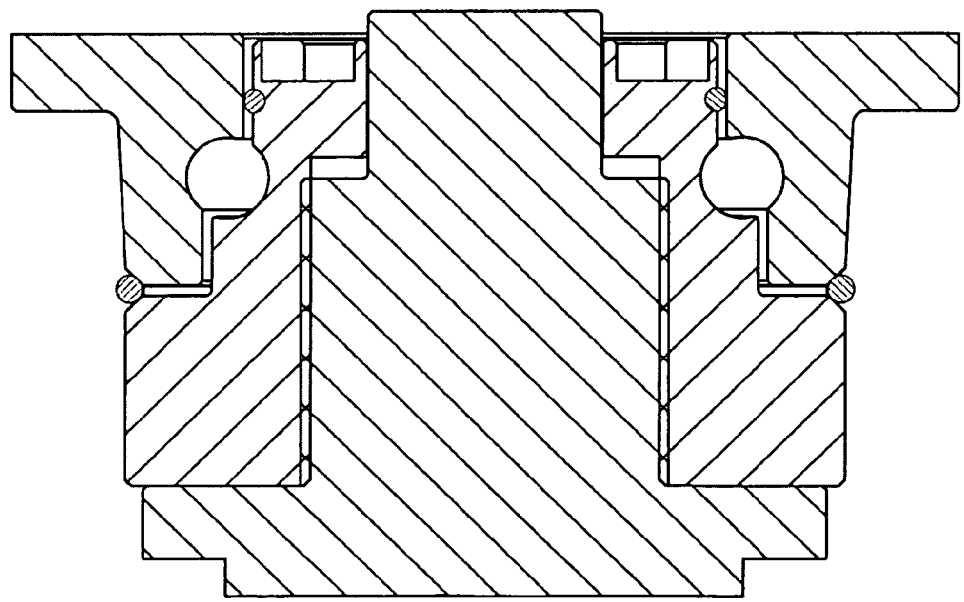
Figure 15:
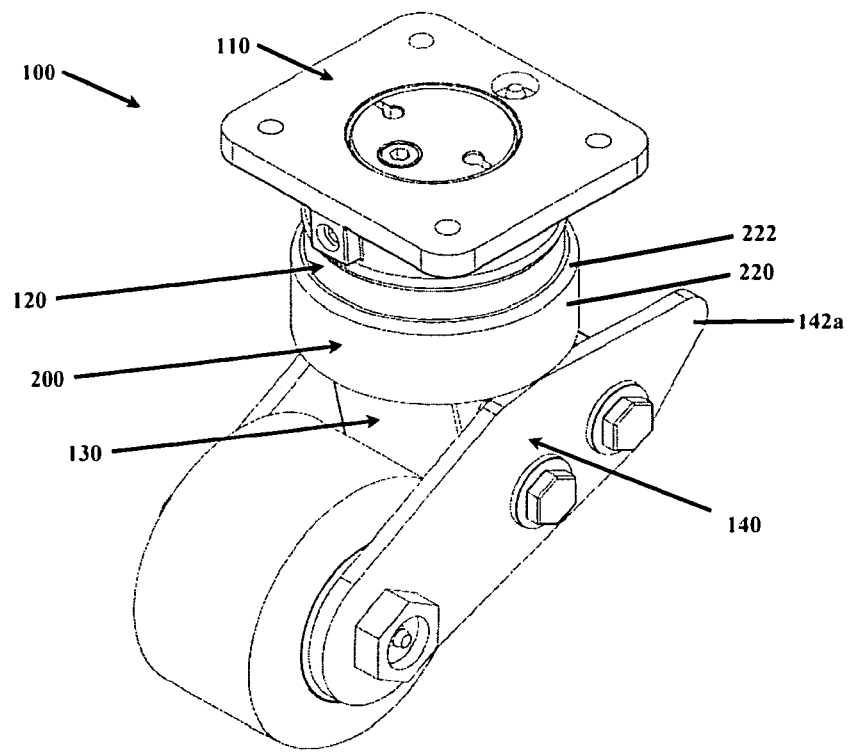
FIGS. 15-20 show a second exemplary embodiment of a height-adjustable industrial caster wheel according to this invention, where FIGS. 15-20 correspond to FIGS. 1, 5, 7, 10, 12 and 14, respectively.
Figure 16:
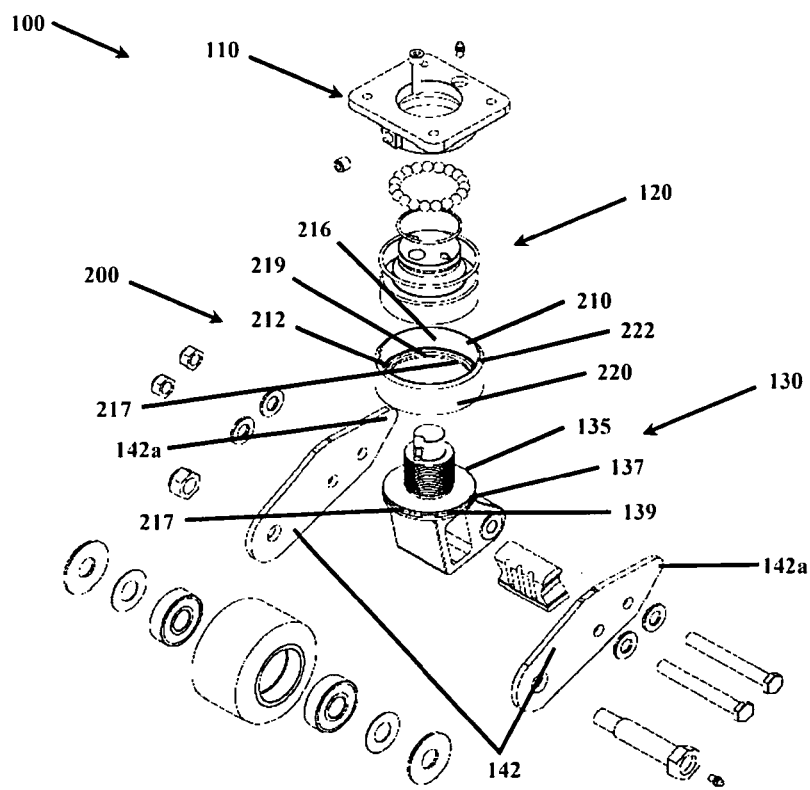

FIGS. 9-14 illustrate 3 different height positions of the height-adjustable industrial caster wheel 100. In particular, FIGS. 9 and 10 are, respectively, side plan and vertical cross-sectional views through the height-adjustable industrial caster wheel 100 when it is in an extended position. In contrast, FIGS. 11 and 12 are, respectively, side plan and vertical cross-sectional views through the height-adjustable industrial caster wheel 100 when it is in an intermediate position, while FIGS. 13 and 14 are, respectively, side plan and vertical cross-sectional views through the height-adjustable industrial caster wheel 100 when it is in a lowered position.

In FIGS. 9 and 10, the operator or maintenance worker places the height-adjustable industrial caster wheel 100 into the extended position by unscrewing the bolt 180, placing the holding and turning members into the engagable structures 190 and 192, respectively, and turning the swivel member 120 counterclockwise relative to the height-adjustable spring housing 130. The operator or maintenance worker turns the swivel member 120 until a maximum permissible extension point is reached. This maximum permissible extension point can be indicated in any desired known or later-developed effective manner, and can be any desired relative position between the swivel member 120 and the height-adjustable spring housing 130.

Once the maximum permissible extension point is reached, the bolt 180 is re-screwed into the threaded passage 182 until the head 184 is sufficiently within the recess 188 formed by the notches 121 and 131. The operator or maintenance worker then disengages the holding and turning members from the engagable structures 190 and 192, respectively.

To move the height-adjustable industrial caster wheel 100 from the extended position into the intermediate position shown in FIGS. 11 and 12, the operator or maintenance worker again unscrews the bolt 180 and places the holding and turning members into the engagable structures 190 and 192, respectively. This time, however, the operator or maintenance worker turns the swivel member 120 clockwise relative to the height-adjustable spring housing 130. The operator or maintenance worker turns the swivel member 120 until the desired intermediate extension point is reached. At that point, the operator or maintenance worker re-screws the bolt 180 into the threaded passage 182 until the head 184 is sufficiently within the recess 188 formed by the notches 121 and 131. The operator or maintenance worker then disengages the holding and turning members from the engagable structures 190 and 192, respectively.

Finally, to move the height-adjustable industrial caster wheel 100 from the intermediate position into the fully lowered position shown in FIGS. 13 and 14, the operator or maintenance worker once again unscrews the bolt 180, places the holding and turning members into the engagable structures 190 and 192, respectively, and turns the swivel member 120 clockwise relative to the height-adjustable spring housing 130. The operator or maintenance worker turns the swivel member 120 until the bottom surface of the swivel assembly 120 contacts the flange 135. At that point, the operator or maintenance worker re-screws the bolt 180 into the threaded passage 182 until the head 184 is sufficiently within the recess 188 formed by the notches 121 and 131. The operator or maintenance worker then disengages the holding and turning members from the engagable structures 190 and 192, respectively.

FIGS. 15-20 illustrate a second exemplary embodiment of a height-adjustable industrial caster wheel 100 according to this invention. As indicated above, FIGS. 15-20 correspond respectively to FIGS. 1, 5, 7, 10, 12 and 14. As shown in FIGS. 15-20, in this second exemplary embodiment, the height-adjustable industrial caster wheel 100 shown in FIGS. 1-14 additionally includes a shroud 200. As shown in varying levels of detail in FIGS. 15-20, the shroud 200, in various exemplary embodiments, is attached to, mounted on or otherwise carried by the height-adjustable spring housing 130. Of course, it should be appreciated that the shroud 200 could alternatively be attached to, mounted on or otherwise carried by the swivel member 120.

As shown in FIGS. 15-20, the shroud 200 is a generally annular member having a body, the body having an inner surface 210 and an outer surface 220. In the exemplary embodiment shown in FIGS. 15-20, a top portion 222 of the outer surface 220 tapers inwardly and connects to the inner surface 210 to form a top surface of the shroud 200. A bottom portion 212 of the inner surface 210 includes a first mounting portion 219 of a complementary mounting structure 217, while an outer surface 137 of the flange 135 includes a second mounting portion 139 of the complementary mounting structure 217. The first and second mounting portions 219 and 139 interact or engage with each other to secure the shroud 200 in place on the height-adjustable spring housing 130.

Because, in the exemplary embodiment shown in FIGS. 15-20, the outer surface 137 of the flange 135 is radially within, or closer to the rotational axis of the caster, by a certain amount relative to the outer surface of the swivel member 120, the bottom portion 212 of the inner surface 210 includes a projecting portion 214 that extends inwardly by a corresponding amount. The first mounting portion 217 is provided on the inner surface 215 of this projecting portion. Of course, if the outer surface 137 of the flange 135 were radially outside of the outer surface of the swivel member 120, the projecting portion 214 would be replaced with an indented portion, with the first mounting portion 217 provided on the inner surface of that indented portion.

Figure 17:
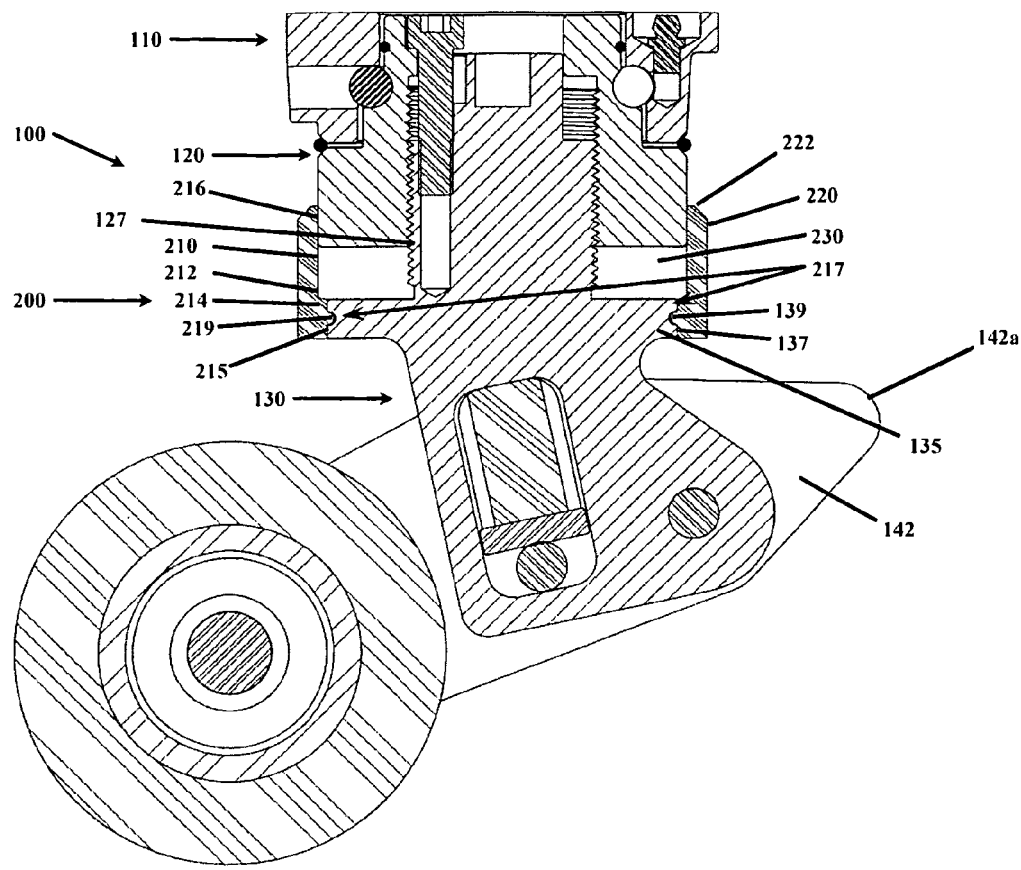

As shown in FIG. 17, the inner surface 210, or at least a top portion 216 of the inner surface 210, fits tightly against or at least closely to, the outer surface of the swivel member 120. By fitting tightly against or at least closely to, the outer surface of the swivel member 120, the shroud 200 effectively seals off a space 230 behind the shroud 200. This space 230 is further defined by a bottom portion of the swivel member 120, a top surface of the flange 135 and the inner threads of the threads 127. By fitting tightly against, or at least closely to, the outer surface of the swivel member 120, any debris, contamination or the like that has become attached to the outer surface of the swivel member 120, and which might contaminate or otherwise foul the threads 127, is wiped away or dislodged. By effectively sealing away this space 230, the shroud 200 helps reduce the amount of, and ideally prevent any, debris, contamination or the like that might enter the space 330.

Figure 18:
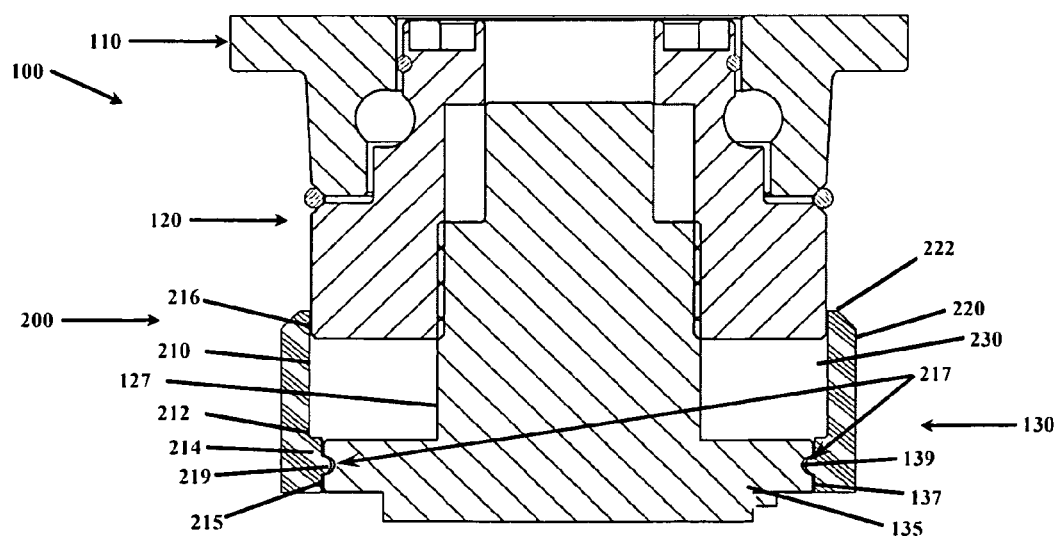
Figure 19:
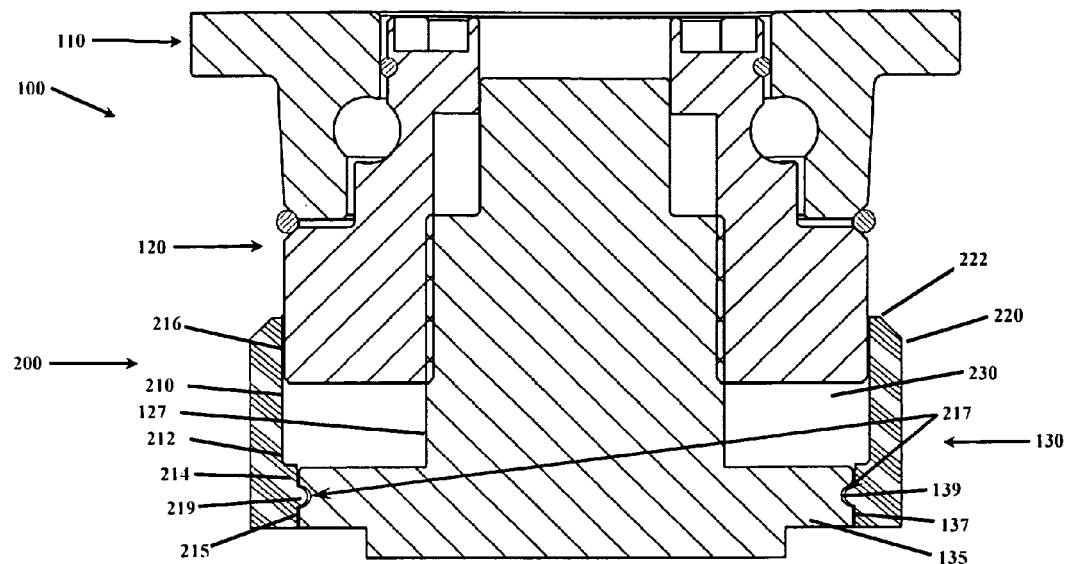
Figure 20:
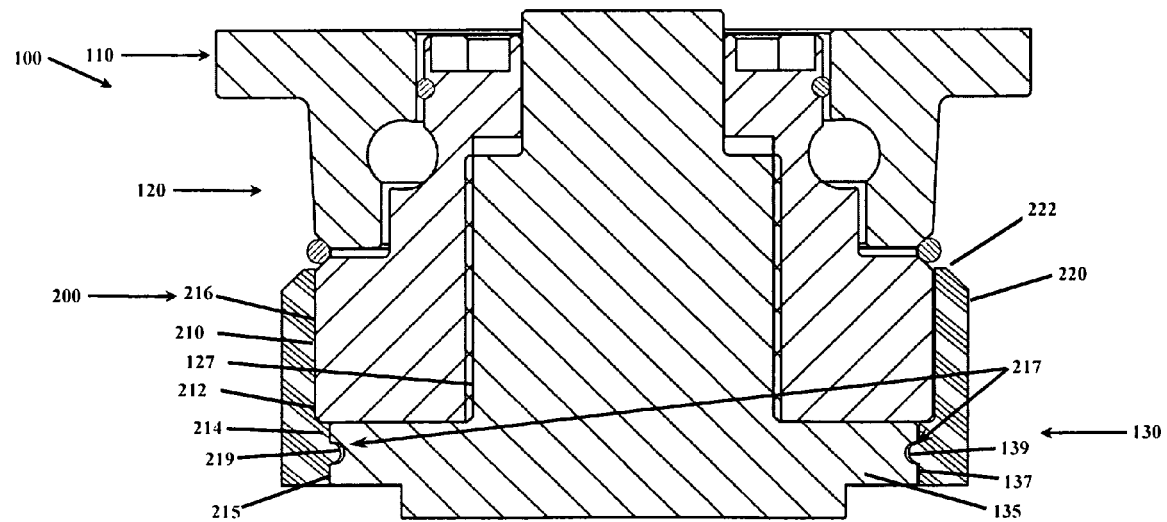

As shown in FIGS. 18-20, as the position of the swivel member 120 changes relative to the height-adjustable spring housing 130, the close-fitting inner surface 210 slides across the outer surface of the swivel member 120. Accordingly, the shroud 200 helps reduce the amount of, and ideally, prevent, any debris, contamination or the like from entering into the space 230 behind the shroud and potentially fouling the threads 127. Because the likelihood that debris, contamination or the like that could foul the threads 127 actually reaches the threads 127 is reduced, and ideally eliminated, the threads 127 are less likely to, and ideally do not, become jammed, fouled or the like as the position of the height-adjustable spring housing 130 is adjusted up or down relative to the swivel member 120. Similarly, the shroud 200 also acts to reduce the likelihood, and ideal eliminate the possibility, that any grease or other lubricant applied to the threads 127 leaks out of the space 230 and thus contaminates the exterior of the height-adjustable industrial caster wheel 100 and/or the ambient environment.

In the exemplary embodiment shown in FIGS. 15-20, the shroud 200 is made of an elastic material, such as polyurethane. This allows the shroud 200 to be sized so that at least the top portion 216 of the inner surface must be stretched at least slightly to provide the close, or even tight, fit of at least the top portion 216 the shroud 200 to the swivel member 120. Of course, it should be appreciated that the shroud 200 can be made of any appropriate known or later developed elastic material, and can be made of any other appropriate known or later developed material. For example, when used in a food service facility, the shroud 200 may need to be made of a specific type of material to meet food safety requirements.

It should be appreciated that, in various other exemplary embodiments, the shroud 200 can be mounted to the swivel member 120, rather than the height-adjustable spring housing 130. In such exemplary embodiments, the bottom portion 212 of the inner surface 210 is adjacent to the outer surface of the swivel member 120, rather than the height-adjustable spring housing 130. Similarly, the top portion 216 is "below" the bottom portion 212 and extends adjacent to an outer surface of the height-adjustable spring housing 130, such as an outer surface of the flange 135, instead of adjacent to the outer surface of the swivel member 120. As in the exemplary embodiment described above, the bottom portion 212 may include a projecting portion 214 that extends radially inwardly, and either the bottom portion 212 or the projection portion 214 includes the complementary mounting structure 217. In these exemplary embodiments, however, the second mounting portion 139 is provided on the outer surface of the swivel member 120. In such exemplary embodiments, it should be appreciated that care should be taken so that the shroud 200 is not damaged by the side plates 142 during operation.

In still other exemplary embodiments, an accordion-like bellows member is used in place of the shroud 200. In such exemplary embodiments, both the top and bottom portions of the bellows member includes a complementary mounting structure 217 or the like, while both the swivel member 120 and the height-adjustable spring housing 130 are provided with a second mounting portion 139 or the like on their outer surfaces. An annular body portion, similar to the body of the shroud 200, extends between the top and bottom portions of the bellows member and includes a number of folds. These folds allow the bellows member to readily expand along the axial dimension as the swivel member 120 and the height-adjustable spring housing 130 move relatively away from each other, and to readily contract without interfering in the operation of the height-adjustable industrial caster wheel 100 as the swivel member 120 and the height-adjustable spring housing 130 move relatively toward each other. That is, as the swivel member 120 and the height-adjustable spring housing 130 move relatively toward each other, the body portion folds up neatly along the folds.

The industrial caster wheel, as it moves with the pallet truck or other device it is attached to, is oriented so that a front surface of the spring housing faces the direction in which the pallet truck or other device is moving and the wheel assembly is behind the spring housing. In various exemplary embodiments of an industrial caster wheel according to this invention, the industrial caster wheel has one or more leading edge members that are located forward of that front surface of the spring housing and that have ramped or sloped bottom surface (s). In various exemplary embodiments, each side plate includes a leading edge member. In various other exemplary embodiments, the one or more leading edge members are attached to or are portions of the front surface of the spring housing.

In operation, the pallet truck or other device the industrial caster wheel is attached to travels over a support surface, which often has one or more upwardly extending offsets. As each industrial caster wheel having one or more leading edge members approaches and passes over a sufficiently-high upwardly extending offset in the support surface, the ramped or sloped bottom surface(s) of the one or more leading edge members contacts the top edge and/or surface of that offset before most or any of the other elements of the industrial caster wheel. Those ramped or sloped bottom surface(s) gradually raise that industrial caster wheel relative to that offset, such that the spring housing and/or the wheel assembly are able to more easily pass over that offset with less shock or impact on that industrial caster wheel and thus on that pallet truck or other device and any objects on that pallet truck or other device.

As also shown in FIGS. 15-20, in contrast to the side plates 142 shown in FIGS. 1-14, in this second exemplary embodiment, the side plates 142 additionally include a leading edge extension 142a. As shown in varying levels of detail in FIGS. 15-20, in various exemplary embodiments, the leading edge extension 142a acts as a skid plate that allows the height-adjustable industrial caster wheel 100 according to this invention, or any similar industrial caster wheel, such as those shown in the incorporated 161 and 319 patents, to more easily pass over a ridge, a threshold or the like, over an edge or other offset when moving from a lower surface to a higher surface, or the like. The leading edge extensions 142a are shaped so that the bottom edges of the leading edge extensions 142a are angled toward the device to which one or more of the industrial caster wheels 100 are attached. Stated differently, those bottom edges of the leading edge extensions 142a are angled away from the surface the industrial caster wheel 100 is travelling across.

In this embodiment of the side plates 142, as a pallet truck, or other device to which one or more of the industrial caster wheel 100 are attached, moves over an uneven surface, the leading edge extension 142a faces in the direction of movement. When one such industrial caster wheel 100 approaches an edge, offset or other abrupt change in the level of the uneven surface, from lower to higher, the leading edge extensions 142a are the first portions of that given industrial caster wheel 100 to contact the edge, offset or other abrupt change. Because the bottom edges of the leading edge extensions 142a are angled away from the surface the industrial caster wheel 100 is travelling across, they are able to extend and slide over that edge, offset or other abrupt change while the wheel 152 supports the pallet truck or other device on the lower portion of the uneven surface. As they slide over that edge, offset or other abrupt change, more of the weight supported by the industrial caster wheel 100 is transferred from the wheel 152 to, and is borne by, the leading edge extensions 142a. At the same time, the wheel 152 is at least partially lifted by the leading edge extension 142a bearing against that edge and/or the upper surface.

Thus, when the wheel 152 of the industrial caster wheel 100 comes into contact with that edge, offset or other abrupt change, it is able to easily pass over that edge, offset or other abrupt change onto the upper portion of the uneven surface. In contrast, a conventional industrial caster wheel that lacks the leading edge extensions 142a must traverse or overcome the entire edge, offset or other abrupt change at the time the wheel 152 encounters that edge, offset or other abrupt change. This typically causes a significant jolt or shock to the conventional industrial caster wheel, and thus to the pallet truck or other device that the conventional industrial caster wheel is attached to. In contrast, an industrial caster wheel 100 that includes the leading edge extensions 142a typically slides over such edges, offsets or other abrupt changes, reducing, if not eliminating, any jolt or shock as the industrial caster wheel 100 traverses an edge, offset or other abrupt change.

It should also be appreciated that the industrial caster wheel 100 described above can be further modified to meet the requirements for a specific industry or application, such as for use in a food processing facility. For example, to use the industrial caster wheel 100 in a food processing facility, certain structural requirements must be met. To meet these requirements, the typical industrial caster wheel 100 is modified to use sealed wheel bearings 154, to seal the plug 117 into the opening 115, and to remove the grease fittings 116 and 149 and the opening 114. In this case, the typical grease(s) used to lubricate the ball bearings 170 and the wheel bearings 154 would also be replaced with grease(s) appropriate for sealed wheel and/or ball bearings.

Figure 21:
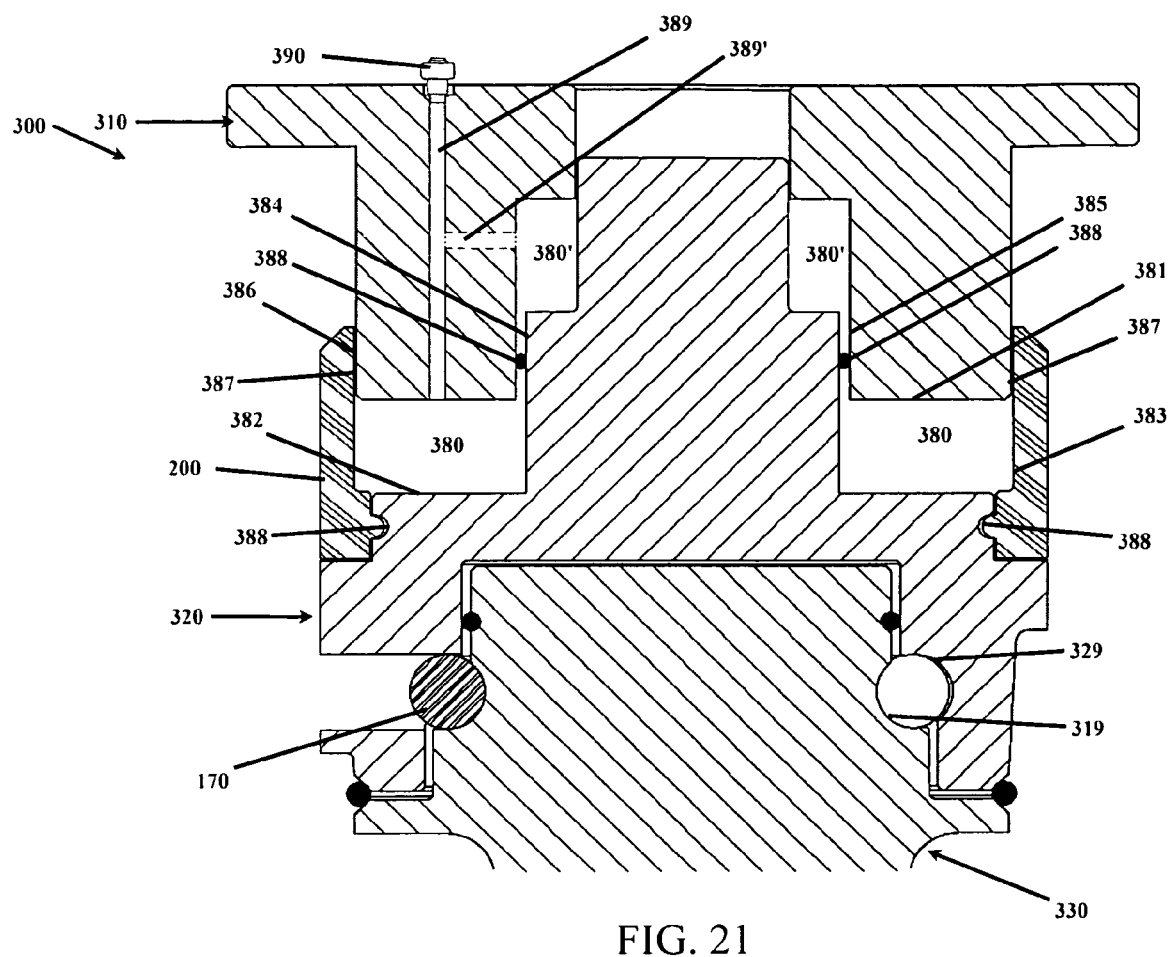
FIG. 21 is a vertical cross-sectional view through a second exemplary embodiment of a height-adjustable industrial caster wheel according to this invention.

FIG. 21 illustrates a second exemplary embodiments of a height-adjustable industrial caster wheel 300 according to this invention. As shown in FIG. 21, and in contrast to the first exemplary embodiment shown in FIG. 7, in this second exemplary embodiment, a swivel assembly 320 is controllably or selectively displaceable relative to a mounting plate 310, while the spring housing 330 is pivotably mounted to the swivel assembly 320 and combines with the swivel assembly 320 to form the swivel bearing system. Similarly in contrast to the first exemplary embodiment shown in FIG. 7, the top surface accessible lubrication passage and the lubrication fitting (not shown) are provided in the swivel assembly 320. The ball bearing channel 329 formed in the swivel assembly 320 is now formed in the bottom surface of the swivel assembly 329, while the complementary ball bearing channel 319 is formed in a top surface of the spring housing 330.

Furthermore, in this second exemplary embodiment, in place of the two threaded elements used in the first exemplary embodiment shown in FIG. 7, the height-adjusting mechanism uses hydraulic or pneumatic fluid to adjust the height of the height-adjustable industrial caster wheel 300. Thus, as shown in FIG. 21, portions of the bottom surface of the mounting plate 310 and portions of the top surface of the swivel assembly 320 combine to form a hydraulic or pneumatic fluid space 380, such that the height of the height-adjustable industrial caster wheel 300 can be adjusted by selectively adding or removing a hydraulic or pneumatic fluid from the hydraulic or pneumatic fluid space 380. In the exemplary embodiment shown in FIG. 21, the hydraulic or pneumatic fluid space 380 is formed by a radially extending annular surface 381, and a first axially extending surface 383 (which can be formed in the bottom surface of the mounting plate 310 or the top surface of the swivel assembly 320) and a radially extending annular surface 382 and a second axially extending surface 384 formed in the top surface of the swivel assembly 320.

The radially extending annular surfaces 381 and 382 generally face or oppose each other and form the piston surfaces the hydraulic or pneumatic fluid presses against to move the swivel assembly 320 away from the mounting plate 310. A third axially extending surface 385 formed in the bottom surface of the mounting plate 310 faces the second axially extending surface 384. Likewise, a fourth axially extending surface 386, which can be formed in the top surface of the swivel assembly 320 or in or by the bottom or outside surfaces of the mounting plate 310, faces the first axially extending surface 383. Seal members, devices or structures 387 and 388 are provided between the first and fourth axially extending surfaces 383 and 386 and between the second and third axially extending surfaces 384 and 385, respectively, to contain the hydraulic or pneumatic in the hydraulic or pneumatic fluid space 380. A fluid supply passage 389 is formed in the mounting base 310, although it just as easily can be provided in the swivel assembly 320. A fluid supply fitting 390, such as a quick-connect fitting, is provided in the top end of the fluid supply passage 389.

The height-adjustable industrial caster wheels 300 are often attached to pallet trucks and other self-propelled devices that include hydraulic or pneumatic pumps or fluid supply devices and one or more hydraulically- or pneumatically-powered mechanisms, such as lifts, jacks, braces, and the like, along with controls used by a worker to operate those devices. When such pallet trucks and other self-propelled devices are provided with one or more height-adjustable industrial caster wheels 300, they can also be provided with appropriate controls that allow the worker to actively operate the height-adjustable industrial caster wheels 300 without having to take any other action. For example, in some such exemplary embodiments, the pallet truck or other device the height-adjustable industrial caster wheel is attached to includes a hydraulic or pneumatic fluid supply device, pump or the like. An outlet of the hydraulic or pneumatic fluid supply device is connected to one end of a fluid supply hose. The other end of the fluid supply hose is detachably connected to the fluid supply fitting 390 that is located on the top surface of the mounting plate 310. The fluid supply fitting 390 is fluidly connected to the hydraulic or pneumatic fluid space 380 by the fluid supply passage 389.

In operation, the user manipulates controls on the pallet truck or other device to supply fluid from a fluid reservoir of the fluid supply device to the fluid space 380 and to withdraw fluid from the fluid space 380 back into the fluid reservoir. As the hydraulic or pneumatic fluid is supplied to the fluid space 380, the hydraulic or pneumatic fluid presses against the radially extending surfaces 381 and 382 and forces them apart. This in turn forces the mounting plate 310 and the swivel assembly 320 to move apart from each other, increasing the height of the height-adjustable industrial caster wheel. This also increases the height of the fluid space 380, by increasing the height of the first or exposed portions of the first axially extending surface 383 and the second axially extending surface 384. In contrast, as the hydraulic or pneumatic fluid is withdrawn from the fluid space 380, the pressure applied by the hydraulic or pneumatic fluid against the radially extending surfaces 381 and 382 is insufficient to offset the load on that adjustable industrial caster wheel 300, which thus moves the radially extending surfaces 381 and 382 towards each other and decreases the first or exposed portions of the first axially extending surface 383 and the second axially extending surface 384. In turn, the mounting plate 310 and the swivel assembly 320 to move toward each other, decreasing the height of the height-adjustable industrial caster wheel.

In various other exemplary embodiments, usable with pallet trucks or other devices that either lack fluid supply devices or lack available outlets and/or controls for the number of height-adjustable industrial caster wheels 300, a portable fluid supply device can be used instead. In such exemplary embodiments, to adjust the height of a given one of the one or more attached height-adjustable industrial caster wheels 300, a user moves the portable fluid supply device adjacent to the height-adjustable industrial caster wheel 300 to be adjusted. The user next connects the fluid supply hose from the portable fluid supply device to the fluid supply fitting 390. The user then operates the portable fluid supply device to add hydraulic or pneumatic fluid to, or withdraw hydraulic or pneumatic fluid from, the fluid space 380 of that height-adjustable industrial caster wheel 300 until the desired adjusted height is obtained. The user can then detach the fluid supply hose from the fluid supply fitting 390. The user can then either move the portable fluid supply device adjacent to another height-adjustable industrial caster wheel 300 of that pallet truck or other device that is to be adjusted, or remove the portable fluid supply device from the vicinity of that pallet truck or other device.

In variations on the fourth exemplary embodiment shown in described above, a second fluid space 380' can be formed between the mounting plate 310 and the swivel assembly 320, either in addition to or in place of the fluid space 380. As shown in FIG. 21, the first fluid space 380 has relatively wider radially extending surfaces, but relatively shorter exposed portions of the axially extending surfaces, than the second space 380'. The first fluid space 380 provides a greater load surface that the hydraulic or pneumatic fluid can act against, reducing the load per unit area applied by the hydraulic or pneumatic fluid. This reduces the overall stress on the height adjusting mechanism, but requires a larger volume of the hydraulic or pneumatic fluid be transferred to obtain a given height adjustment.

In contrast, the second fluid space 380' provides a smaller load surface that the hydraulic or pneumatic fluid can act against, but with a corresponding smaller overall volume. This increases the load per unit area applied by the hydraulic or pneumatic fluid, thus increasing the overall stress on the height adjusting mechanism. However, it also requires a relatively smaller volume of the hydraulic or pneumatic fluid be transferred to obtain a given height adjustment, thus increasing the responsiveness of the height adjusting mechanism. In those variations where the second fluid space 380' is used in place of the first fluid space 380, the bottom portion of the fluid supply passage 389 is omitted in place of a side fluid supply passage 389a that extends from the fluid supply passage 389 to the second fluid space 380'.

It should also be appreciated that the first and second fluid spaces 380 and 380' can be used to implement a hydraulic or pneumatic height-adjusting systems that has both the fluid space and the fluid reservoir contained within the height-adjustable industrial caster wheel 300 itself. That is, the larger-volume first fluid space 380 can be used as a fluid reservoir, while the second fluid space 380' forms the hydraulic or pneumatic piston that moves the mounting plate 310 and the swivel assembly 320 relative to each other. In such variations, the top portion of the fluid supply passage 389 is used to charge the hydraulic system, but in operation the side fluid supply passage 389a is used in place of that top portion of the fluid supply passage 389. In such embodiments, one of the mounting plate 310 and the swivel assembly 320 would need to be provided with a pump device usable to move the hydraulic or pneumatic fluid through the first and second fluid passages 389 and 389a from the first or fluid reservoir space 380 to the second or piston fluid space 380' to increase the height of the height-adjustable industrial caster wheel 300. If the pump could be operated in either direction, it could also be used to decrease the height of the height-adjustable industrial caster wheel 300. Alternatively, a release valve or the like and a third fluid passage could be used to return the hydraulic or pneumatic fluid from the second or piston fluid space 380' to the first or reservoir fluid space 380.

Such pumps, release valves, etc. could be electrically operated, by connecting them to either a control system of the pallet truck or other device or to a portable control device. Alternatively, they could be mechanically operated, such as by the user manipulating a lever, plunger, shaft, spindle, axel, cam or the like connected to the pump and/or to the release valve, either directly or indirectly. It should be appreciated that any appropriate known or later-developed mechanical mechanism or device could be used to operate the pump and/or the release valve. In such exemplary embodiments, one or more locking mechanisms, similar in purpose to that described above with respect to FIGS. 1-8, should be implemented to prevent inadvertent or accidental operation of either or both of the pump and, if implemented, the release valve.

In various exemplary embodiments of the height-adjustable industrial caster wheel according to this invention, height-adjustable industrial caster wheel includes at least one seal and/or protective member 387 and/or 388 usable to isolate the height adjusting system, mechanism or device from the surrounding environment. For some height-adjustable industrial caster wheels, the seal and/or protective member 388 is formed at least in part by the shroud 200 (discussed above) that is mounted to one relatively displaceable element. The shroud 200 extends over and slides relatively to an outer surface of the other relatively displaceable element. In the exemplary embodiment shown in FIG. 21, the shroud 200 forms the first axially extending surface 383 as well as the seal and/or protective member 387. In this exemplary embodiment, the shroud 200, and thus the first axially extending surface 383, is attached to the swivel assembly 320. However, as discussed above, the shroud 200, and thus the first axially extending surface 383, can alternatively be attached to the mounting plate 310.

For some such height-adjustable industrial caster wheels having a hydraulic or pneumatic fluid space, the at least one seal and/or protective member includes at least one O-ring 387 and/or other fluid-tight structure, device or mechanism provided between the two relatively displaceable elements. For other such height-adjustable industrial caster wheels having a hydraulic or pneumatic fluid space, the first or fourth axially extending surface 383 or 386 and the seal and/or protective member 387 are provided by an expandable bellows. The bellow forms at least a portion of one of the axially extending surfaces 383 or 386 of the hydraulic or pneumatic fluid space 380. End portions of the bellows are mounted to both relatively displaceable elements and can include O-rings and/or other fluid-tight structures, devices or mechanisms as the seal and/or protective member 387.

With respect to FIGS. 7 and 21, it should be appreciated that, in place of the ball-bearing system formed by the channels 119/319 and 129/329 and the ball bearings 170, the industrial caster wheel 100 or 300 can include any appropriate known or later developed swivel bearing system that allows the swivel assembly 120/320 to rotate relatively to the mounting plate 110 or the spring housing 330. A lubrication passage from the swivel bearing system extends through one of the mounting plate 110 or the swivel assembly 320 from a top surface of that element and fluidly connects the bearing system to that top surface. A lubrication port having a lubrication fitting is formed in/at the top of the lubrication passage at that top surface such that the lubrication fitting is accessible to a maintenance worker from above the industrial caster wheel 100 or 300. This allows the maintenance worker to connect a hose to the lubrication fitting and supply lubrication material to the swivel bearing system through an access opening in the pallet truck or other device the industrial caster wheel is attached to.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A height-adjustable industrial caster wheel, comprising:
    a mounting base attachable to a movable device to be supported at least in part by the height-adjustable industrial caster wheel and having a top surface, wherein the top surface faces that movable device when the mounting base is attached to that movable device;
    a swivel assembly at least indirectly connected to the mounting base;
    a spring housing at least indirectly connected to the swivel assembly;
    a side plate assembly at least indirectly connected to the spring housing such that the side plate assembly is pivotable relative to the spring housing;
    a caster wheel assembly at least indirectly connected to the side plate assembly such that the caster wheel assembly is rotatable relative to the side plate assembly; and
    a height adjusting mechanism that allows the swivel assembly to be selectively axially displaced relative to the one of the mounting base and the spring housing, comprising:
        a first relatively displaceable component associated with the swivel assembly, and
        a second relatively displaceable component associated with one of the mounting base and the spring housing, such that, in response to displacing the first relatively displaceable component relative to the second relatively displaceable component, the swivel assembly and the one of the mounting base and the spring housing are relatively axially displaced.

2. The height-adjustable industrial caster wheel of claim 1, wherein:
    the height adjusting mechanism further comprises a locking assembly, comprising a locking mechanism that is movable between a first position that maintains the relative position between the first and second relatively displaceable components and a second position that allows the relative position between the first and second relatively displaceable components to be changed; and
    the locking mechanism has an operating structure that is usable to move the locking mechanism between the first and second positions and that is accessible from above the top surface of the mounting base.

3. The height-adjustable industrial caster wheel of claim 2, wherein the operating structure is engagable using a common tool.

4. The height-adjustable industrial caster wheel of claim 2, wherein the operating structure comprises at least one of:
    a hexagonal recess engagable using a standard dimension alien wrench;
    a hexagonal projection engagable using a standard dimension nut driver or a standard dimension socket;
    a star-shaped recess engagable using a standard dimension torx driver;
    a cruciform-shaped engagable using a standard dimension phillips driver; and
    a slot-shaped recess engagable using a standard dimension slotted screwdriver.

5. The height-adjustable industrial caster wheel of claim 4, wherein
    the mounting base has an access passage extending through the top surface;
    portions of at least one of the swivel assembly and the spring housing extend through the access passage; and
    the locking mechanism is associated with the portions of at least one of the swivel assembly and the spring housing that extend into the access passage and at least the operating structure of the locking mechanism is visible to a user viewing the height-adjustable industrial caster wheel from above the top surface of the mounting base.

6. The height-adjustable industrial caster wheel of claim 5, wherein:
    the access passage extends through the mounting base to the top surface;

portions of at least one of the swivel assembly and the spring housing extend through the access passage to the top surface of the mounting base;

the locking mechanism further comprises at least one second operating structure provided on a top surface of one of portions of the swivel assembly and the spring housing that extend into the access passage, the at least one second operating structure accessible via the access passage and useable to hold one of the mounting base and the spring housing in position relative to the swivel assembly; and the at least one second operating structure is engagable using a common tool.

7. The height-adjustable industrial caster wheel of claim 5, wherein:

the swivel housing is relatively displaceable relative to the spring housing;

the access passage extends through the mounting base to the top surface;

portions of at least one of the swivel assembly and the spring housing extend through the access passage to the top surface of the mounting base;

the first relatively displaceable component of the height adjusting mechanism associated with the swivel assembly comprises an internally threaded passage provided in and extending through the swivel assembly;

the second relatively displaceable component of the height adjusting mechanism is associated with the spring housing and comprises an externally threaded surface provided on a projecting portion of the spring housing, where the projecting portion and the externally threaded surface are sized so that the externally threaded surface threadably engages the internally threaded passage and the projecting portion of the spring housing extends into the internally threaded passage of the swivel member, and the spring housing is axially displaced relative to the swivel assembly by appropriately rotating the spring housing relative to the swivel assembly such that the externally threaded projecting portion moves into and out of the internally threaded passage.

8. The height-adjustable industrial caster wheel of claim 7, wherein:

the locking mechanism further comprises an elongated threaded member having a first diameter, wherein the operating structure is associated with an upper surface of the elongated threaded member; and the locking assembly further comprises a threaded passage provided in the spring housing and sized to threadably engage the elongated threaded member; and in the first position of the locking mechanism, the elongated threaded member is screwed sufficiently into the threaded passage such that at least a first portion of the elongated threaded member is located within the threaded passage and at least a second portion of the elongated threaded member interacts with at least the swivel assembly such that the swivel assembly and the spring housing are prevented from rotating relative to each other and, in the second position of the locking mechanism, the elongated threaded member is screwed sufficiently out of the threaded passage such that the swivel assembly and the spring housing are able to rotate relative to each other.

9. The height-adjustable industrial caster wheel of claim 8, wherein:

the locking mechanism further comprises a head member provided at one end of the elongated threaded member as the second portion of the elongated threaded member, wherein the head member has a diameter greater than a diameter of the elongated threaded member and the operating structure is associated with an upper surface of the head member; and the locking assembly further comprises a first portion of an enlarged recess provided in a top portion of the internally threaded passage of the swivel assembly and sized to accept the head member, and a second portion of the enlarged recess provided in the projecting portion of the spring housing above the threaded passage and sized to accept the head member, wherein, in the first position of the locking mechanism, the elongated threaded member is screwed sufficiently into the threaded passage such that at least a portion of the head member is located within and interacts with at least the first portion of the enlarged recess such that the swivel assembly and the spring housing are prevented from rotating relative to each other and, in the second position of the locking mechanism, the elongated threaded member is screwed sufficiently out of the threaded passage such that the entire head member is located outside of at least the first portion of the enlarged recess such that the swivel assembly and the spring housing are able to rotate relative to each other.

10. The height-adjustable industrial caster wheel of claim 1, wherein:

the first relatively displaceable component of the height adjusting mechanism associated with the swivel assembly comprises a first threaded surface;

the second relatively displaceable component of the height adjusting mechanism associated with the one of the mounting base and the spring housing comprises a second threaded surface that opposes the first threaded surface, wherein the first and second threaded surfaces cooperatively engage each other, and the swivel assembly is axially displaced relative to the one of the mounting base and the spring housing by appropriately rotating the one of the mounting base and the spring housing relative to the swivel assembly such that the second threaded surface moves axially relative to the first threaded surface.

11. The height-adjustable industrial caster wheel of claim 1, wherein:

the first relatively displaceable component of the height adjusting mechanism comprises a first radially extending surface, a first axially extending surface extending from a first end of the first radially extending surface and a third axially extending surface extending from a second end of the first radially extending surface;

the second relatively displaceable component of the height adjusting mechanism comprises a second radially extending surface, a second axially extending surface extending from a first end of the second radially extending surface and a fourth axially extending surface extending from a second end of the second radially extending surface;

the first and second radially extending surfaces oppose each other and first portions of the first and fourth axially extending surfaces oppose each other to form a fluid space;

the height adjusting mechanism further comprises:

a fluid passage formed in one of the mounting base and the swivel assembly and extending from the corresponding one of the first and second radially extending surfaces and a top surface of that one of the mounting base and the swivel assembly, and a connector having a first end fluidly connected to the fluid passage and a second end detachably fluidly connectable to a fluid supply hose; and the one of the mounting base and the spring housing is axially displaced relative to the swivel assembly by appropriately supplying a fluid to and removing a fluid from the fluid space through the fluid passage such that the first radially extending surface correspondingly moves towards and away from the second radially extending surface.

12. The height-adjustable industrial caster wheel of claim 11, wherein:

the third and fourth axially extending surfaces face each other and are closely adjacent to each other; and the height adjusting mechanism further comprises a first seal provided between the third and fourth axially extending surfaces that maintains the fluid within the fluid space.

13. The height-adjustable industrial caster wheel of claim 12, wherein:

the first and second axially extending surfaces face each other and are closely adjacent to each other; and the height adjusting mechanism further comprises a second seal provided between the first and second axially extending surfaces that maintains the fluid within the fluid space.

14. The height-adjustable industrial caster wheel of claim 13, wherein:

one of the first and second axially extending surface is a shroud;

a first axial end of the shroud is sealingly attached to one of the swivel assembly and the one of the mounting base and the spring housing;

a second axial end of the shroud is adjacent to the other one of the swivel assembly and the one of the mounting base and the spring housing; and the second seal is provided between the second axial end of the shroud and the other one of the swivel assembly and the one of the mounting base and the spring housing.

15. The height-adjustable industrial caster wheel of claim 1, further comprising an annular protective member that is connected to at least one of, and extends between, the swivel assembly and one of the mounting base and the spring housing.

16. The height-adjustable industrial caster wheel of claim 15, wherein:

the swivel assembly comprises a body having an internal passage provided in and extending through the body and a bottom portion that extends from the body radially outwardly beneath the mounting base and that has an outer circumferential surface;

the spring housing comprises a projecting portion sized so that the projecting portion of the spring housing is able to move axially within the internal passage of the body of the swivel assembly as the first and second relatively displaceable components are displaced relative to each other;

the spring housing further comprises a radially-extending portion located axially below the projecting portion relative to the swivel assembly and that extends radially outwardly relative to the projecting portion; and the annular protective member extends over and between the radially-extending portion of the spring housing and the bottom portion of the swivel assembly to at least partially separate the projecting portion and the internal passage from the ambient environment.

17. The height-adjustable industrial caster wheel of claim 16, wherein:

the annular protective member is an annular shroud member;

the annular shroud member comprises a first axial portion that extends circumferentially around and engages the radially-extending portion of the spring housing;

the annular shroud member further comprises a second axial portion that extends circumferentially around and axially over the outer circumferential surface of the bottom portion of the swivel assembly; and as the swivel assembly and the spring housing move axially relative to each other, the second axial portion of the annular shroud member moves axially relative to the outer circumferential surface of the bottom portion of the swivel assembly, while extending axially over the outer circumferential surface over the full range of relative axial motion between the swivel assembly and the spring housing.

18. The height-adjustable industrial caster wheel of claim 17, an outer circumferential surface of the radially-extending portion has a first component of a complementary mounting structure; and the first axial portion of the annular shroud member has a second component of the complementary mounting structure provided on a radial inner surface, the first axial portion sized such that the second component of the complementary mounting structure securely engages with the first component of the complementary mounting structure.

19. A pallet truck, comprising:

a base member;

at least one first set of at least one mounting structure provided on the base member;

for at least one first set of at least one mounting structure, an access structure provided in the base member adjacent to that first set of at least one mounting structure; and at least one height-adjustable industrial caster wheel attached to the base member, each attached height-adjustable industrial caster wheel attached using one of the at least one first set of at least one mounting structure and located adjacent to the corresponding access structure, the height-adjustable industrial caster wheel comprising:

a mounting base attachable to the movable device and having a top surface that faces the base member;

a swivel assembly at least indirectly connected to the mounting base;

a spring housing at least indirectly connected to the swivel assembly;

a side plate assembly at least indirectly connected to the spring housing such that the side plate assembly is pivotable relative to the spring housing;

a caster wheel assembly at least indirectly connected to the side plate assembly such that the caster wheel assembly is rotatable relative to the side plate assembly; and a height adjusting mechanism that allows the swivel assembly to be selectively axially displaced relative to the one of the mounting base and the spring housing, comprising:

a first relatively displaceable component associated with the swivel assembly, and a second relatively displaceable component associated with one of the mounting base and the spring housing, such that, in response to displacing the first relatively displaceable component relative to the second relatively displaceable component, the swivel assembly and the one of the mounting base and the spring housing are relatively axially displaced.

20. A movable device having at least one height-adjustable industrial caster wheel attached to the movable device, the movable device comprising:
    a caster-supported member;
    at least one first set of at least one mounting structure provided on the caster-supported member;
    for at least one first set of at least one mounting structure, an access structure provided in the caster-supported member adjacent to that first set of at least one mounting structure; and
    at least one height-adjustable industrial caster wheel attached to that caster-supported member, each attached height-adjustable industrial caster wheel attached using one of the at least one first set of at least one mounting structure and located adjacent to the corresponding access structure, the height-adjustable industrial caster wheel comprising:
        a mounting base attachable to the movable device and having a top surface that faces the caster-supported member;
        a swivel assembly at least indirectly connected to the mounting base;
        a spring housing at least indirectly connected to the swivel assembly;
        a side plate assembly at least indirectly connected to the spring housing such that the side plate assembly is pivotable relative to the spring housing;
        a caster wheel assembly at least indirectly connected to the side plate assembly such that the caster wheel assembly is rotatable relative to the side plate assembly; and
        a height adjusting mechanism that allows the swivel assembly to be selectively axially displaced relative to the one of the mounting base and the spring housing, comprising:
            a first relatively displaceable component associated with the swivel assembly, and
            a second relatively displaceable component associated with one of the mounting base and the spring housing, such that, in response to displacing the first relatively displaceable component relative to the second relatively displaceable component, the swivel assembly and the one of the mounting base and the spring housing are relatively axially displaced.

* * * * *